US008867687B2

(12) United States Patent
Bertozzi et al.

(10) Patent No.: US 8,867,687 B2
(45) Date of Patent: *Oct. 21, 2014

(54) NON-INTRUSIVE METHOD TO IDENTIFY PRESENCE OF NUCLEAR MATERIALS USING ENERGETIC PROMPT NEUTRONS FROM NEUTRON-INDUCED FISSION

(71) Applicant: Passport Systems, Inc., Billerica, MA (US)

(72) Inventors: William Bertozzi, Lexington, MA (US); Robert J. Ledoux, Harvard, MA (US)

(73) Assignee: Passport Systems, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,869

(22) Filed: Jan. 22, 2013

(65) Prior Publication Data

US 2013/0208842 A1     Aug. 15, 2013

Related U.S. Application Data

(63) Continuation of application No. 12/204,189, filed on Sep. 4, 2008, now Pat. No. 8,358,730, and a continuation of application No. 12/139,050, filed on Jun. 13, 2008.

(60) Provisional application No. 60/971,638, filed on Sep. 12, 2007.

(51) Int. Cl.
| | | |
|---|---|---|
| *G01T 3/04* | (2006.01) | |
| *G01T 3/06* | (2006.01) | |
| *G21G 1/12* | (2006.01) | |
| *G01T 3/00* | (2006.01) | |
| *G01V 5/00* | (2006.01) | |

(52) U.S. Cl.
CPC ............. *G01T 3/00* (2013.01); *G01V 5/0091* (2013.01)
USPC ........................................................ 376/158

(58) Field of Classification Search
USPC ........................................................ 376/153
See application file for complete search history.

(56) References Cited

U.S. PATENT DOCUMENTS

| | | | | | |
|---|---|---|---|---|---|
| 3,456,113 | A | * | 7/1969 | Keepin | 376/254 |
| 3,636,353 | A | * | 1/1972 | Untermyer | 376/194 |

(Continued)

FOREIGN PATENT DOCUMENTS

| | | | |
|---|---|---|---|
| WO | WO 2005059594 A1 | * | 6/2005 |
| WO | WO 2006010056 A2 | * | 1/2006 |

OTHER PUBLICATIONS

Nakamura et al., "Sequential Measurements of Cosmic-Ray Neutron Spectrum and Dose Rate at Sea Level in Sendai, Japan", Journal of Nuclear Science and technology, vol. 42, No. 10, pp. 843-853 (Oct. 2005).*

(Continued)

*Primary Examiner* — Jack W Keith
*Assistant Examiner* — Sean P Burke
(74) *Attorney, Agent, or Firm* — Stephen B. Deutsch; Peter K. Sollins; Foley Hoag LLP

(57) ABSTRACT

Methods and systems for non-intrusively detecting the existence of fissile materials in a container via the measurement of energetic prompt neutrons are disclosed. The methods and systems use the unique nature of the prompt neutron energy spectrum from neutron-induced fission arising from the emission of neutrons from almost fully accelerated fragments to unambiguously identify fissile material. These signals from neutron-induced fission are unique and allow the detection of any material in the actinide region of the nuclear periodic table.

17 Claims, 19 Drawing Sheets

Detector System

(56) References Cited

U.S. PATENT DOCUMENTS

| | | | | |
|---|---|---|---|---|
| 4,497,768 | A * | 2/1985 | Caldwell et al. | 376/153 |
| 4,620,099 | A * | 10/1986 | Schoenig et al. | 250/358.1 |
| 4,918,315 | A * | 4/1990 | Gomberg et al. | 250/390.04 |
| 5,440,136 | A * | 8/1995 | Gomberg | 250/390.04 |
| 5,495,106 | A * | 2/1996 | Mastny | 250/253 |
| 6,452,992 | B1 * | 9/2002 | Umiastowski | 376/170 |
| 6,724,852 | B1 * | 4/2004 | Smith et al. | 376/154 |
| 7,142,625 | B2 * | 11/2006 | Jones et al. | 376/153 |
| 7,151,815 | B2 * | 12/2006 | Ruddy et al. | 376/158 |
| 2005/0135534 | A1 * | 6/2005 | Jones et al. | 376/153 |
| 2005/0220247 | A1 * | 10/2005 | Ruddy et al. | 376/159 |
| 2007/0019788 | A1 * | 1/2007 | Ledoux et al. | 378/88 |
| 2007/0102640 | A1 * | 5/2007 | Ing et al. | 250/358.1 |
| 2007/0102646 | A1 * | 5/2007 | Goldberg | 250/390.01 |

OTHER PUBLICATIONS

Baerg, A.P. et al.; "The Angular Distribution of Photofission Fragments", Canadian Journal of Physics, 37, (1959), p. 1418.*

Berman, B.L. et al.;, "Photofission and photoneutron cross sections and photofission neutron multiplicities for $^{233}U$, $^{234}U$, $^{237}Np$ and $^{239}Pu$", Physical Review C 34 (6), (1986) pp. 2201-2214.*

Bertozzi, W.; "Time-of-Flight Measurements of Photoneutron Energy Spectra", Physical Review, 119, (1958), pp. 790-791.*

Bowman, H.R. et al.; "Velocity and Angular Distributions of Prompt Neutrons from Spontaneous Fission of $^{252}Cf$", Phys. Rev., 126 (6), (1962), pp. 2120-2136.*

Geraldo, L.P.; "Angular Distribution of the Photofission Fragments of $^{237}Np$ at Threshold Energy", Journal of Physics G: Nuclear Physics, 12, (1986), pp. 1423-1431.*

H. W. Koch, "Experimental Photo-Fission Thresholds in $^{235}U$, $^{238}U$, $^{233}U$, $^{239}Pu$ and $^{232}Th$", Physical Review, 77, (1950), pp. 329-336.*

M.B. Chadwick, P. Oblozinsky, M. Herman at al., "ENDF/B-VII.0: Next Generation Evaluated Nuclear Data Library for Nuclear Science and Technology", Nuclear Data Sheets, 107, pp. 2931-3060, (2006).*

Nair, S. and Gayther, D.B.; "Neutron angular distributions from fast-neutron-induced fission of $^{232}Th$ and $^{238}U$", Journal of Physics G: Nuclear Physics, vol. 3 No. 7), (1977), pp. 949-964.*

Nair, S. et al.; "Fission-neutron and fragment angular distributions from threshold photofission of $^{232}Th$ and $^{238}U$", Journal of Physics, G: Nuclear Physics, 3 (7), (1977), pp. 965-978.*

Sargent, C.P. et al.; "Prompt Neutrons from Thorium Photofission", Physical Review, 137 (1B), (1965), pp. B89-B101.*

Schmitt, H.W. et al.; "Fragment Energy Correlation Measurements for $^{252}Cf$ Spontaneous Fission and $^{236}U$ Thermal-Neutron Fission", Phys. Rev. 141 (3), (1966) pp. 1146-1160.*

Segre, Emilio; Nuclei and Particles an Introduction to Nuclear and Subnuclear Physics, W. A. Benjamin, Inc., New York (1964), p. 502.*

Terrell, J.; "Neutron Yields from Individual Fission Fragments", Physical Review, 127 (3), (1962), pp. 880-904.*

Winhold, E.J. and Halpern, I.; "Anisotropic Photofission" Physical Review, 103, (1956), pp. 990-1000.*

Winhold, E.J. et al.; "The Angular Distribution of Fission Fragments in the Photofission of Thorium" Physical Review, 87, (1952), pp. 1139-1140.*

International Search Report and Written Opinion for PCT/US 08/66919.*

International Search Report and Written Opinion for PCT/2008/075195.*

Caldwell et al., "Experimental Determination of Photofission Neutron Multiplicities for $^{235}U$, $^{236}U$, $^{238}U$, and $^{232}Th$ Using Monoenergetic Photons," Nuclear Science and Engineering, vol. 73, p. 153-163 (1980).*

Caldwell et al., "Giant resonance for the actinide nuclei: Photoneutron and photofission cross sections for $^{235}U$, $^{236}U$, $^{238}U$, and $^{232}Th$," Physical Review C., vol. 21., No. 4. p. 1215-1231 (1980).*

* cited by examiner

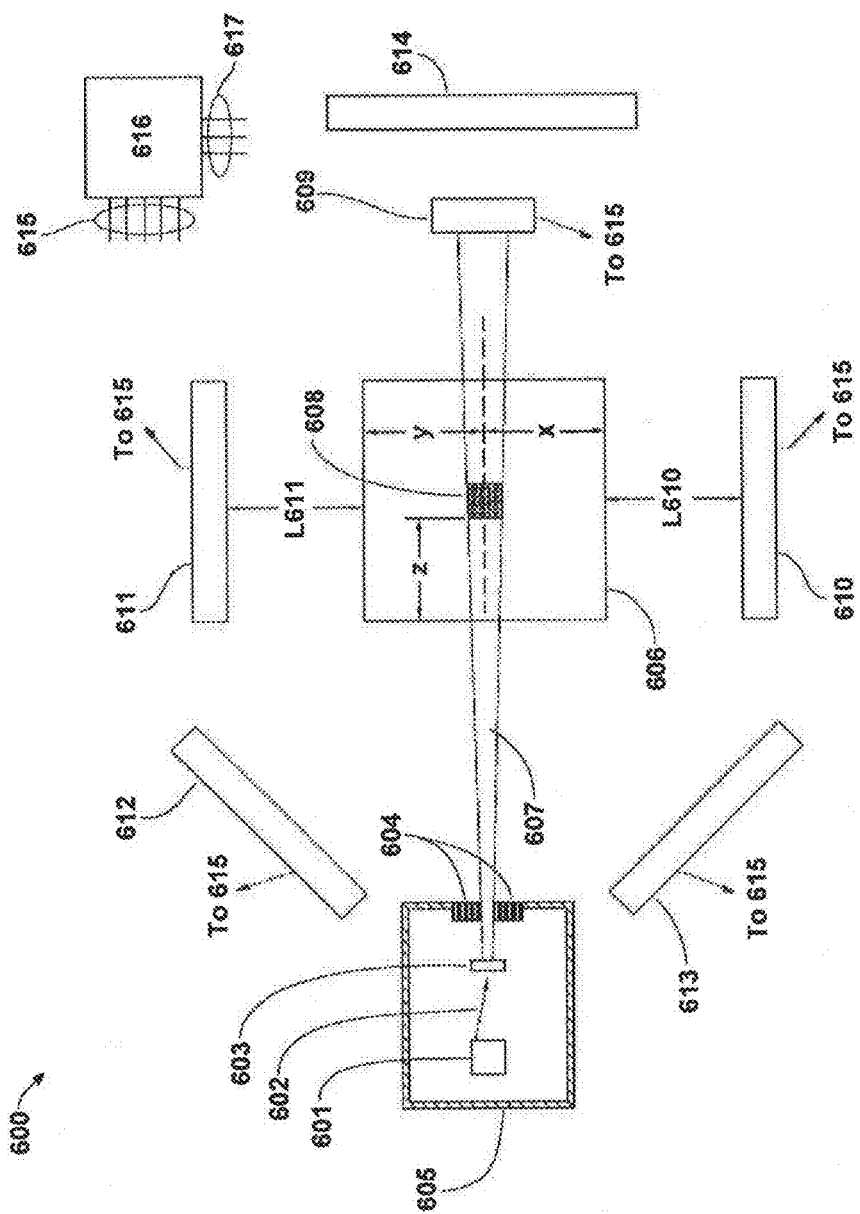
Figure 6  Detector System

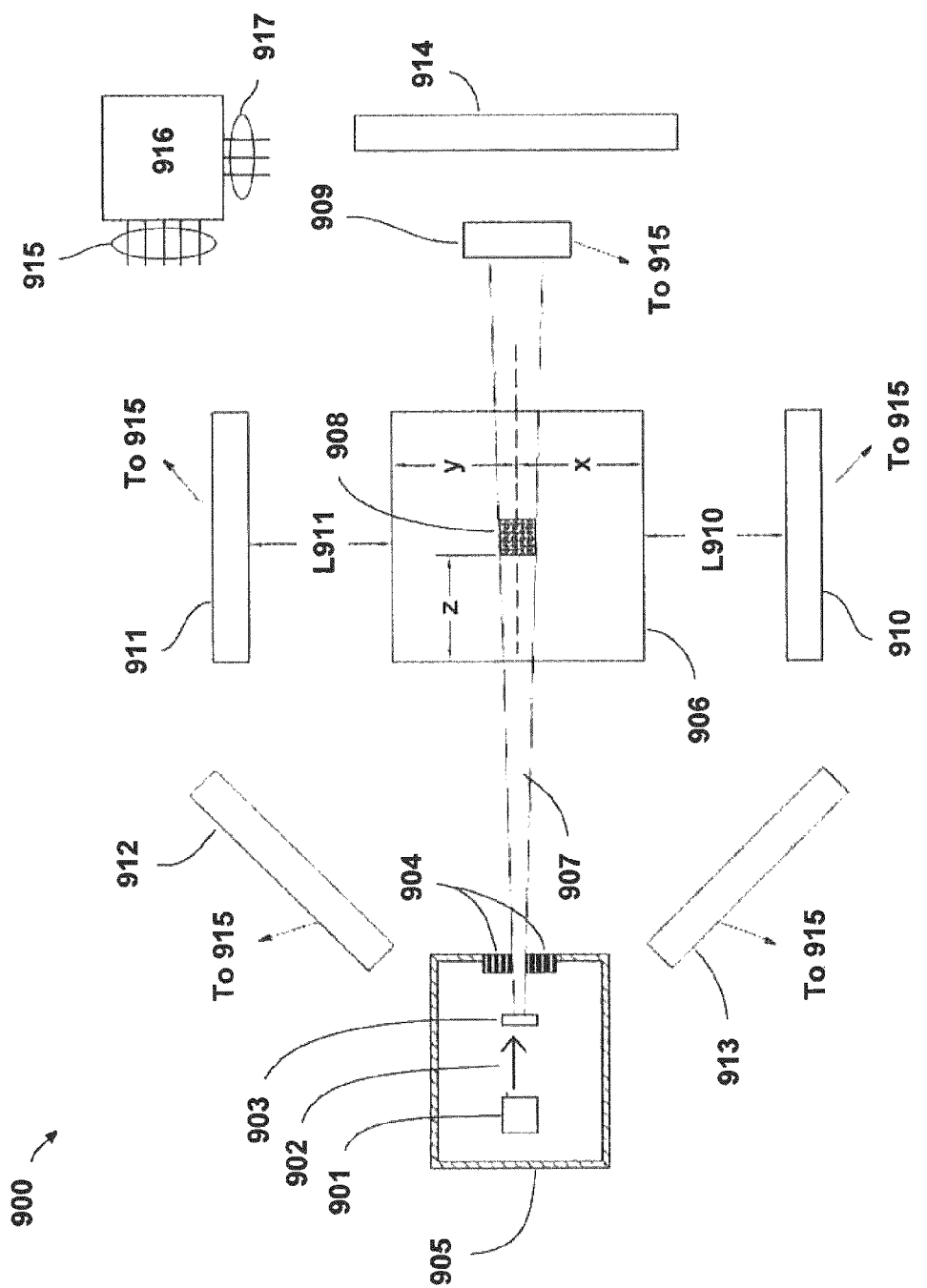
Figure 9  Detector System

NON-INTRUSIVE METHOD TO IDENTIFY PRESENCE OF NUCLEAR MATERIALS USING ENERGETIC PROMPT NEUTRONS FROM NEUTRON-INDUCED FISSION

CROSS-REFERENCE TO RELATED APPLICATIONS

The present application claims the benefit of: (1) U.S. patent application Ser. No. 12/204,189, entitled "Non-Intrusive Method To Identify Presence Of Nuclear Materials Using Energetic Prompt Neutrons From Photon-Induced Fission" which was filed on Sep. 4, 2008 by William Bertozzi and Robert J. Ledoux, and is also hereby incorporated by reference; (2) U.S. Provisional Patent Application Ser. No. 60/971,638, entitled "Non-Intrusive Method To Identify Presence Of Nuclear Materials Using Energetic Prompt Neutrons From Photon Induced Fission And Neutron-Induced Fission" which was filed on Sep. 12, 2007 by William Bertozzi and Robert J. Ledoux, and is hereby incorporated by reference: and (3) U.S. patent application Ser. No. 12/139,050, entitled "Non-Intrusive Method To Identify Presence Of Nuclear Materials Using Energetic Prompt Neutrons From Photon-Induced Fission" which was filed on Jun. 13, 2008 by William Bertozzi and Robert J. Ledoux, and is also hereby incorporated by reference.

STATEMENT REGARDING FEDERALLY SPONSORED RESEARCH OR DEVELOPMENT

This invention was made with government support under Contract No. N66001-07-D-0025/Delivery Order No. 0001 awarded by the U.S. Navy. The government has certain rights in the invention.

FIELD OF THE INVENTION

This disclosure relates to systems and methods for detecting the presence of fissionable nuclear materials. The systems and methods make use of the distinctive signals provided by the energy and angular distributions of the prompt neutrons produced in neutron induced fission of nuclei. They may be used to detect the presence of actinide nuclei (in particular those with Z greater than or equal to 89, that of actinium). Some of these nuclei are classified as Special Nuclear Materials (SNM) and may be used in weapons of mass destruction such as nuclear explosives and in dirty bombs.

BACKGROUND

Illicit clandestine shipment of nuclear explosives, materials that can be employed in the fabrication of nuclear explosives, and materials that can be employed in the fabrication of dirty bombs may constitute a major threat to the peace and security of the world. Such materials may be secreted and smuggled in cargo or other shipments in various containers including ordinary luggage, crates, vehicles, cargo containers, etc. by terrorists, potential terrorists, terrorist supporters, or others. Effective and efficient methods and systems are required for the reliable, non-intrusive, detection of such contraband materials in ports and in other cargo and shipping locations in order to reduce the risk of successful illicit shipments, without unduly impeding the worldwide flow of cargo in a manner that is disruptive of normal commerce. Accordingly, it is especially important that the detection methods not produce large numbers of false positive detection events.

Passive detection methods, as for example gamma spectroscopy of natural decay, have not proven universally effective since many of the materials of interest are not highly radioactive and are relatively easily shielded. X-ray techniques do not readily distinguish between fissionable nuclear materials and innocuous high-Z materials like lead or tungsten that may be legitimately present in cargo.

In addition to passive detection, several approaches to detection have been employed, attempted, or proposed using active techniques employing probing beams.

In one such active technique, an external neutron source has been used to detect fissionable nuclear materials by detecting induced fission events by the neutron multiplication effect of the fission events. However, it has been difficult to discriminate between the probing neutrons and the fission induced prompt neutrons, especially when the energy of the probing neutrons is as high as the energy of the more energetic prompt neutrons from fission or when large containers are involved. Alternative techniques have induced fission events in fissionable nuclear materials with pulsed external neutron sources, then detecting delayed emission of neutrons by fission products, using time delay, as a means of distinguishing the detected signal from the probing neutrons. This delayed neutron signal is a much weaker signal, and is subject to signal-to-noise ratio problems.

It is therefore an object of this disclosure to provide improved systems and methods for detecting fissionable nuclear material in an article with reduced error and ambiguity.

It is a further object of this disclosure to provide improved systems and methods for detecting contraband fissionable nuclear materials by improving discrimination of prompt fission neutrons in the presence of noise-contributing factors.

Another object of this disclosure is to provide systems and methods for analyzing the energy or an energy spectrum of prompt fission neutrons to detect the presence of fissionable nuclear materials in an article.

A still further object of this disclosure is to provide systems and methods for detecting an angular distribution of prompt fission neutrons to detect the presence of fissionable nuclear materials in an article.

Yet another object of this disclosure is to provide systems and methods for using an angular distribution of prompt fission neutrons and an energy distribution of prompt fission neutrons to detect the presence of fissionable nuclear materials in an article.

The objects set forth above as well as further and other objects and advantages of the present disclosure are achieved by the embodiments described below.

SUMMARY OF THE INVENTION

A prompt neutron is a neutron emitted immediately after the fission process; it is characterized by being emitted from a fission fragment generally after the fragment has reached a significant fraction of its final velocity, and thus may be referred to as a fully accelerated fragment. The final velocity is imparted to the fragment by the strong Coulomb repulsion between the fission fragments. There are delayed neutrons that arise following the beta-decay of some of the fragments, but these are not considered herein since they are only a small percentage of the neutrons emitted promptly and thus have a negligible effect on the practice of the methods disclosed herein. One of the advantages of utilizing prompt neutrons from neutron-induced fission as a detection technique is that they are produced with approximately 200 times the yield of delayed neutrons; this allows for higher probabilities of detection, lower false positive rates, and faster scan times.

The techniques and methods described in U.S. patent application Ser. No. 12/139,050, to which this application claims priority, and which is incorporated herein, make use of the boost in velocity (and thus energy) of a neutron that arises because the neutron is emitted from a rapidly moving nuclear fragment which has been produced by the (γ, f) process. This boost places the neutron in an energy range that will allow for the unambiguous determination of the presence of fissionable nuclei; this energy range is not possible from other processes that could occur with other non-fissionable nuclei such as direct neutron production by photons (γ, n). Additional features of interest are the nucleus-dependent angular distribution of the fragments in the photo-fission process and the prompt neutron energy distributions at various angles. Thus the signature of photon-induced fission is unique. Also, by controlling the incident photon energy used to cause the fission, (γ, n) processes from other nuclei may be reduced in importance or eliminated as a background. Since the process of photon-induced fission is ubiquitous with the actinides, these methods will identify fissionable nuclear materials within a container, in particular those which have Z equal to or greater than 89, that of actinium.

That disclosure describes systems and methods for detecting fissile materials by measuring prompt neutron energies and examining prompt neutron energy spectra. The energy spectra of prompt neutrons that originate from photo-fission are readily distinguishable from the energy spectra of neutrons that originate from other processes that may occur in non-fissile materials such as (γ, n). Neutrons at energies greater than $E=E_b-E_{th}$, where $E_{th}$ is the threshold for the (γ, n) process in relevant other heavy non-fissile elements and $E_b$ is the endpoint energy of the incident bremsstrahlung photon beam (or the energy of an incident monochromatic photon beam), indicate with no ambiguity the presence of fissile material in the actinide region. No other photon-induced process can generate neutrons with these energies.

Angular distributions of these neutrons reflect the angular distributions of the fission fragments from which they arise: distributions deviating significantly from isotropy indicate the presence of even-even nuclei while almost isotropic distributions indicate the presence of odd-even or even-odd fissile species. (Hereinafter, in the interests of conciseness, "odd-even" shall denote a nucleus with an odd number of nucleons, whether protons or neutrons, and thus the term hereinafter shall encompass both "odd-even" nuclei and "even-odd" nuclei.)

Comparison of the energy distribution of the prompt neutrons at different angles also provides potentially useful information about the species present. If the energy distributions at different angles are nearly identical, the isotopes undergoing fission are odd-even; if the energy distributions differ significantly at different angles, the isotopes undergoing photo-fission are even-even.

Another signature of photo-fission is the fact that the relative yield of prompt neutrons at different neutron energies (i.e., the shape of the yield curve) does not depend upon the incident photon energy. This is in contrast to other processes such as (γ, n) where the relative yield of neutrons at different energies is strongly dependent on incident photon energy, particularly at the highest energies possible.

For a better understanding of that disclosure, together with other and further objects thereof, reference is made to the accompanying drawings and detailed description.

The techniques and methods of this disclosure also make use of the boost in velocity (and thus energy) of neutrons that arises because of the emission of those neutrons from a rapidly moving nuclear fragment after a fission event. In this disclosure, the fission event of interest is triggered by an incident neutron. This energy boost in the emitted neutron contributes to a neutron energy range that will allow for the unambiguous determination of the presence of fissionable nuclei; something not available from other processes such as direct neutron production by photons (γ, n), direct production of neutrons by (n,n') reactions or (n,2n) reactions, for example. An additional feature is the nucleus-dependent angular distribution of the fragments in the neutron induced fission process and the correlation of that distribution to the prompt neutron energy distributions at various angles. Thus the signature of neutron-induced fission is unique as compared to potentially-competing events. Also, by controlling the neutron energy used to cause the fission, background from the neutron generator used to produce neutrons to induce the fission may be reduced in importance or eliminated, which increases the capabilities of the methods. The probability of neutron induced fission depends strongly on the energy of the neutron and this dependence is different for different nuclear species. Since the process of neutron induced fission is ubiquitous with the actinides, these methods will identify fissionable nuclear materials within a container, which have Z equal to or greater than 89, that of actinium, and will also make possible the identification of the particular nuclear species undergoing fission.

This disclosure employs systems and methods for the detection of fissile materials by examining the energy spectra of the prompt neutrons that originate from neutron induced fission in comparison to the energy spectra of neutrons from neutron generators and other neutron induced reactions such as (n,n') and (n,2n) among others. Neutrons can induce fission at energies as low as thermal energies (~1/40 eV) for materials of interest in the construction of nuclear weapons such as $^{235}$U, and $^{239}$U. The cross sections for (n,f) are very large for thermal neutrons for the critical isotopes $^{235}$U and $^{239}$Pu but only modest for $^{237}$Np. However, for higher incident neutron energies, above 1 MeV, all these nuclei present large and usable cross sections for (n,f). In fact, it is the fast neutron fission cross section which is important to making a weapon from fissionable nuclear material. Using a neutron generator in the MeV range will allow the (n,f) reaction with these nuclei and if the incident neutron energy is less than a few MeV it will not provide a background that can be confused with the neutrons from (n,f) because the (n,f) process produces neutrons with higher energies. Neutrons from (n,f) have energies ranging up to 9 MeV or more.

Angular distributions of these prompt neutrons reflect the angular distributions of the fission fragments. This is another signature that can be used to distinguish neutrons from (n,f) and the neutrons from a neutron generator. In particular, the fragments from fission induced by neutrons of several MeV are peaked forward and backwards relative to the initiating neutron direction. At lower energies these fragments may be peaked at 90 degrees, depending on the neutron energy and nucleus.

The energy distribution of the prompt neutrons from fission at different angles to the direction of the initiating neutrons also indicates the angular distribution of the fragments. The neutron energy distributions of the prompt neutrons from (n,f) will be different in the directions parallel to and perpendicular to the direction to the initiating neutron, reflecting the motion of the fragments and their preferred directionality.

Another signature of neutron induced fission is the fact that the relative yield of prompt neutrons at different neutron energies (i.e., the shape of the fission neutron yield in energy)

does not depend strongly upon the energy of the initiating neutron energy. This is in contrast to (n,n') or (n,2n) processes.

This disclosure also employs systems and methods for the detection of fissile materials by examining the energy spectra and angular distributions of prompt neutrons resulting from fission induced by neutrons.

For a better understanding of the present disclosure, together with other and further objects thereof, reference is made to the accompanying drawings and detailed description.

BRIEF DESCRIPTION OF THE DRAWINGS

FIG. 6 shows a schematic layout of a possible arrangement for one embodiment of a system for detecting fissile materials in a container by analyzing energetic prompt neutrons resulting from photon-induced fission;

FIG. 9 shows a schematic layout of a possible arrangement for one embodiment of a system for detecting fissile materials in a container by analyzing energetic prompt neutrons resulting from neutron-induced fission;

DETAILED DESCRIPTION OF THE PREFERRED EMBODIMENTS

Fission is a complex process that has been the subject of many theoretical and experimental studies. (See generally Bohr and Mottelson, "Nuclear Structure", 1998, World Scientific Publishing Co. Pte. Ltd. Singapore, and references therein). However, common empirically established features imply certain general regularities of the process independent of nucleus or initiating particle.

When fission is spontaneous, initiated by low energy neutrons or by the absorption of photons near the threshold for the ($\gamma$, f) process, the dominant mode of fission is the breaking apart of the nucleus into two fragments of unequal masses. These unequal masses are in the regions of nucleon numbers 95 and 140 for $^{235}$U and in similar regions for other fissionable nuclei. The fragments are accelerated by the strong Coulomb repulsion of their charges ($Z_1$, $Z_2$) and gain kinetic energy ranging approximately from 160 to 180 MeV, depending on the nucleus undergoing fission. Most of this Coulomb energy is gained in approximately $10^{-22}$ sec as the fragments separate by several nuclear diameters. The final fragment velocities correspond to kinetic energies of approximately 1 MeV/nucleon for the light fragment and approximately 0.5 MeV/nucleon for the heavy fragment. The rapidly moving fragments are generally excited and emit prompt neutrons, mostly after they have gained most of the kinetic energy available from the Coulomb repulsion.

Figure 1A:
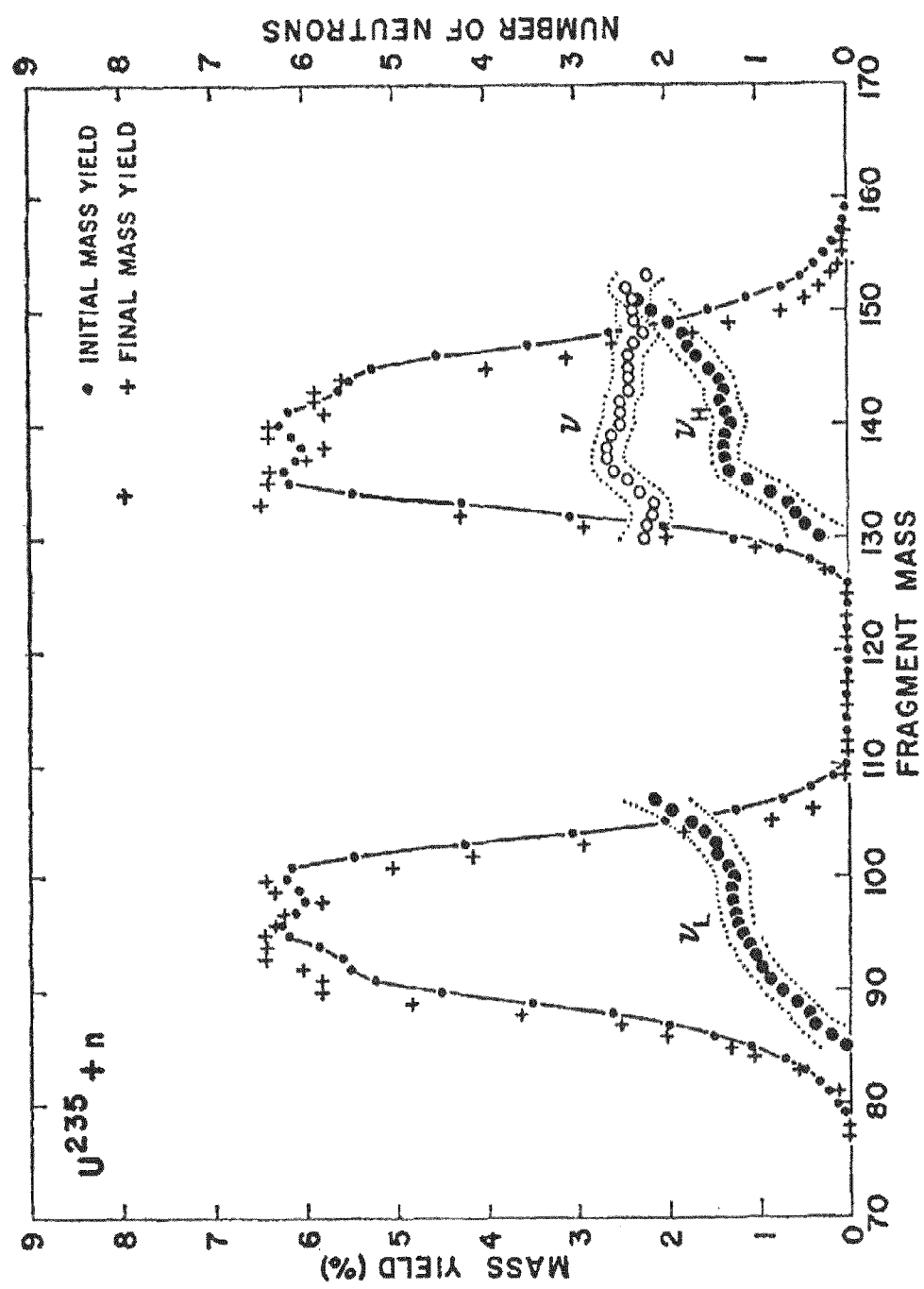
FIGS. 1A and 1B show the fission fragment mass yields and associated average neutron multiplicities as a function of fission fragment mass resulting from neutron-induced fission of $^{235}$U and $^{239}$Pu, respectively.
Figure 1B:
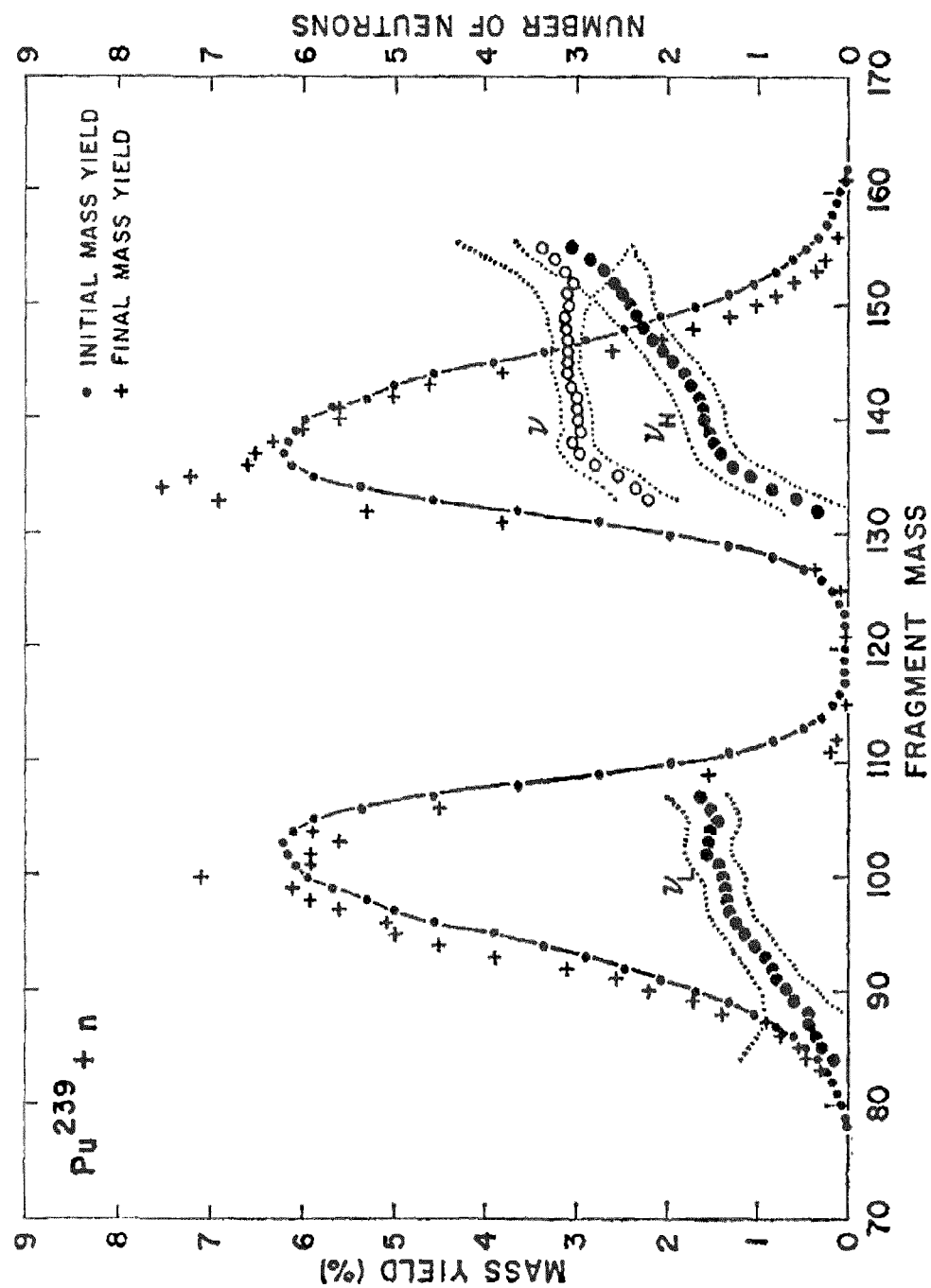

FIGS. 1A and 1B display the analysis by J. Terrell ("Neutron Yields from Individual Fission Fragments", Physical Review, Vol. 127, Number 3, Aug. 1, 1962, pages 880-904, and references therein) for the neutron induced fission of $^{235}$ and $^{239}$Pu. These figures (which correspond to FIGS. 8 and 9 in Terrell) display the asymmetric fragment mass distributions from the neutron-induced fission and the average number of neutrons emitted from the heavy and light fragments, as a function of the mass of the fragments, for $^{235}$U and $^{239}$U. (The symbols $v$, $v_L$ and $v_H$ in FIGS. 1A and 1B denote the average total number of neutrons emitted, the average neutrons emitted from the light fragment and the average neutrons emitted from the heavy fragment, respectively, as a function of fragment mass.)

Similar results have been obtained by Terrell for neutron-induced fission of $^{233}$U and the spontaneous fission of $^{252}$Cf, showing the generality of the phenomena.

Many authors have studied the spontaneous fission of $^{252}$Cf, including Harry R. Bowman, Stanley G. Thompson, J. C. D. Milton and J. Swiatecki: "Velocity and Angular Distributions of Prompt Neutrons from Spontaneous Fission of $^{252}$Cf", Phys. Rev., Volume 126, Number 6, Jun. 15, 1962, page 2120-2136 and references therein. These authors were able to demonstrate by direct measurement that:

a) "The angular distribution (of the neutrons from the spontaneous fission of $^{252}$Cf) is strongly peaked in the direction of the fission fragments. The relative intensities in the direction of the light fragment, in the direction of the heavy fragment and at right angles are about 9, 5 and 1 respectively": and b) "The broad features of the energy and angular distributions are reproduced by the assumption of isotropic evaporation (in the fragment frame of reference) of the neutrons from fully accelerated fragments."

While not the only important conclusions of the Terrell and Bowman works, those quoted and discussed here sustain the general description of spontaneous fission or fission at low energies that is important to the discussion herein.

The work of H. W. Schmitt, J. H. Neiler, and F. J. Walter, "Fragment Energy Correlation Measurements for $^{252}$Cf Spontaneous Fission and $^{235}$U Thermal-Neutron Fission", Phys. Rev. Volume 141, Number 3, January 1966, Page 1146-1160, provides additional evidence of the features described above. They find that the average total fragment kinetic energies before neutron emission are 186.5±1.2 MeV for the spontaneous fission of $^{252}$Ca and 171.9±1.4 MeV for neutron induced fission of $^{235}$U. The fragments have substantially all the kinetic energy available from the mutual Coulomb repulsion of the fragments.

Both the energy distribution and the angular distribution of the neutrons from fission fragments created by photon-induced fission are relevant to the detection of such neutrons.

The case of $^{232}$Th reported in C. P. Sargent, W. Bertozzi, P. T. Demos, J. L. Matthews and W. Turchinetz, "Prompt Neutrons from Thorium Photofission", Physical Review, Volume 137, Number 1B, Jan. 11, 1965, Pages B89-B101 is illustrative. These authors measured the spectra of neutrons from the photo-fission of $^{232}$Th at pairs of angles simultaneously, 157 and 77 degrees relative to the photon beam, and 130 and 50 degrees relative to the photon beam. They used bremsstrahlung photons from electrons with kinetic energies of 6.75 and 7.75 MeV. Several subsidiary facts were important in their analysis:

1.) The ($\gamma$, n) threshold energy for $^{232}$Th is 6.438 MeV. Therefore, the ($\gamma$, n) process cannot contribute neutrons of energy greater than 0.31 MeV and 1.31 MeV, respectively at the two energies of the electron beam, 6.75 MeV and 7.75 MeV. Since these neutron energies are achieved only at the end points of the respective bremsstrahlung spectra, there will not be important contributions to the neutron spectra from the ($\gamma$, n) process even at neutron energies considerably lower than 0.31 or 1.31 MeV, respectively; and 2.) The fission fragments in photo-fission, ($\gamma$, f), are known to have strongly anisotropic angular distributions from 232Th. The distribution is peaked at 90 degrees to the incident photon beam, and the fragment angular distribution is given by I=a+b sin$^2$($\theta$), where $\theta$ is the angle between the incident photon beam direction and the fission fragment direction. The ratio b/a is considerably larger than 1 at the energies discussed herein and remains larger than one even at incident photon energies higher than 9 MeV. (E. J. Winhold, P. T. Demos and I. Halpern, Physical Review, 87, 1139 (1952): and, A. P. Berg, R. M. Bartholomew, F. Brown, L. Katz and S. B. Kowalski, Canadian Journal of Physics, 37, 1418 (1959)). This fragment directionality provides the correlation between neutron angle and neutron energy that results from the velocity boost if the prompt neutrons are emitted from fragments that have their full kinetic energy.

The results of analysis of the neutron energy spectra from $^{232}$Th ($\gamma$, f) are consistent with the following conclusions of Sargent et al:

1.) The fraction of the prompt neutrons that result from emission from other than the fully accelerated fragments is 0.07±0.09;

2.) The prompt neutron angular distributions and energy distributions are consistent with isotropic neutron evaporation with a thermal-type spectrum in the center of mass frame of reference of the moving fragments, where the fragments are moving with their fully accelerated velocities; and 3.) The energy spectrum of the neutrons in the center of mass frame of reference is characterized by an average energy of 1.14±0.06 MeV. There are no significant components of temperature as high as or higher than this average energy. (That is, the ensuing Maxwellian energy distribution, were it applied to a fragment at rest in the laboratory frame of reference without the kinematic boost from the motion of the photo-fission fragments, would not yield many neutrons at the high energies that result from applying the kinematic boost to neutrons emitted in the fragment frame of reference.)

Figure 7:
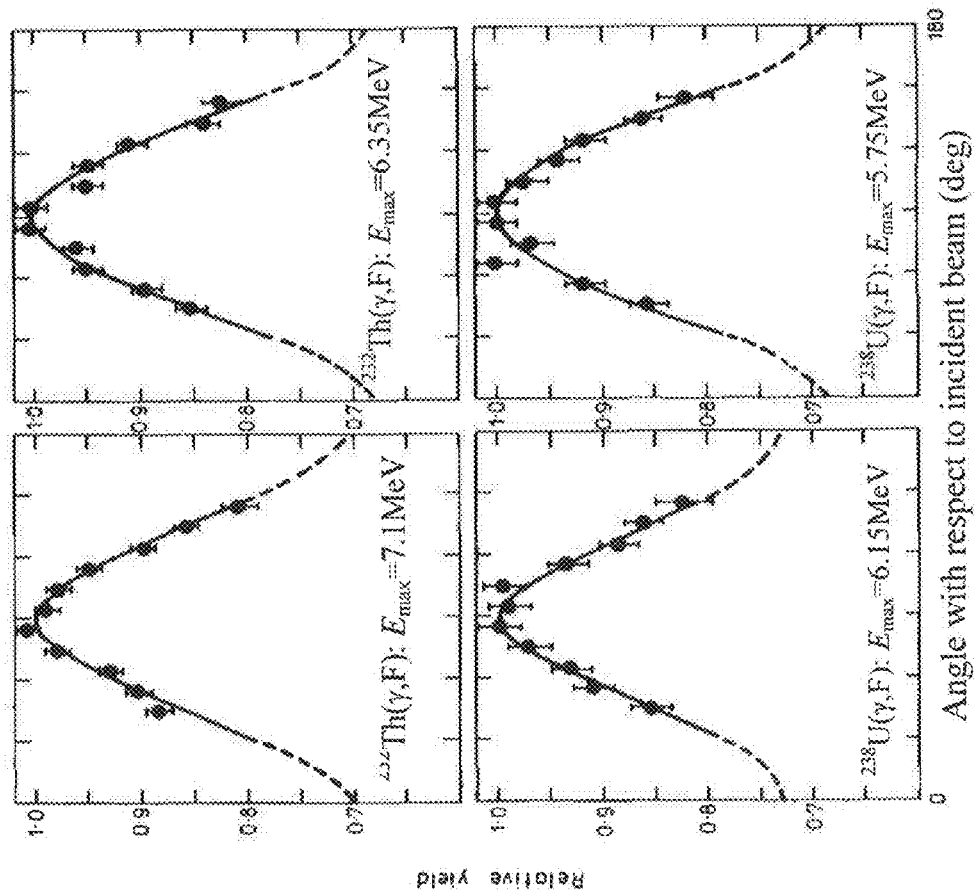
FIG. 7 shows the angular distribution of the neutrons emitted from fission fragments from the photo-fission of $^{232}$Th and $^{238}$U.
Figure 11:
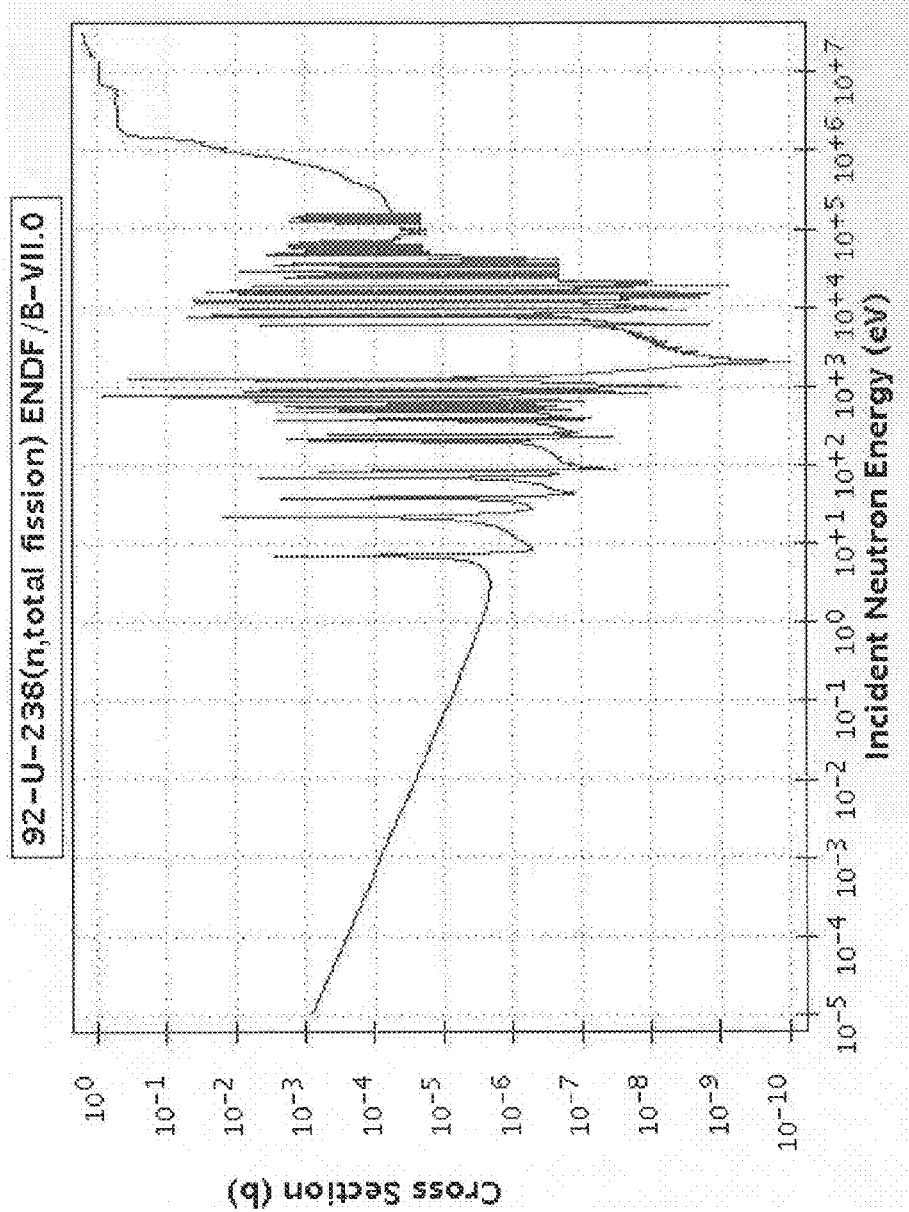
FIG. 11 shows the (n, f) cross section for $^{238}$U.

FIG. 7 presents angular distributions of prompt neutrons from the fission fragments produced in the ($\gamma$, f) process for incident photon energies near the threshold for the ($\gamma$, f) process, for $^{232}$Th and $^{238}$U. It is taken from S. Nair, D. B. Gayther, B. H. Patrick and E. M. Bowey, Journal of Physics, G: Nuclear Physics, Vol. 3, No. 7, 1977 (pp 1965-1978), who corroborate the relevant $^{232}$Th results of Sargent et al. and also extend the results to the photo-fission of $^{238}$U. These angular distributions are measured by detectors which detect the fragments from neutron induced fission of $^{238}$U. Therefore, they are an average over all the energies of the neutrons emitted from the photo-fission fragments convoluted with the (n, f) cross section. This emphasizes neutrons above approximately 1 MeV, where the (n, f) cross section becomes large (See FIG. 11, which presents the (n, f) cross section for $^{238}$U. FIG. 11 is reproduced from National Nuclear Data Center, Brookhaven National Laboratory, ENDF, Evaluated Nuclear (reaction) Data File).

Figure 10:
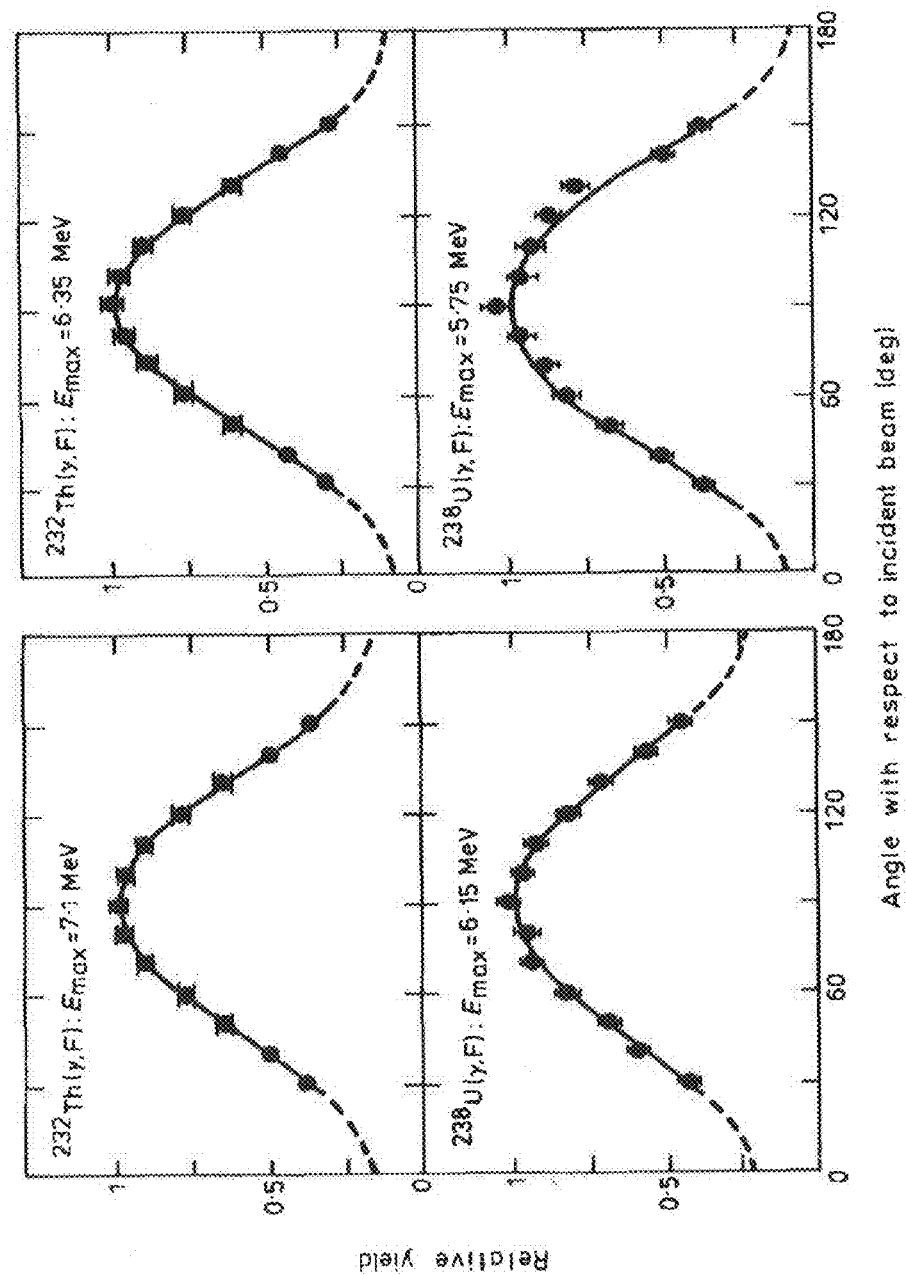
FIG. 10 shows the angular distribution of the fission fragments from the photofission of $^{232}$Th and $^{238}$U.

FIG. 10, also taken from Nair, presents the angular distributions of the fragments from the photo-fission for $^{232}$Th and $^{238}$U, for the same incident photon energies as FIG. 7. The peaking of the neutrons from the photo-fission fragments in the direction of the motion of the fission fragments is clearly demonstrated by a visual comparison of FIG. 7 with FIG. 10. (The implications of the shape of the neutron angular distribution are discussed below.)

Figure 2:
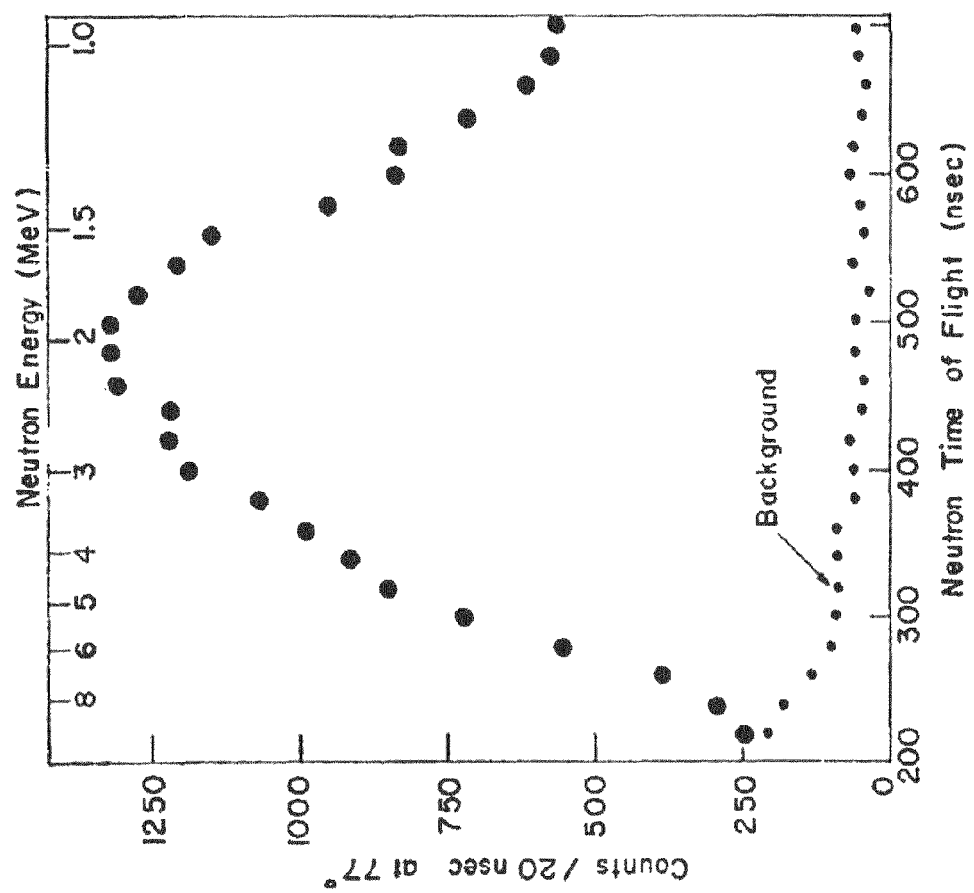
FIG. 2 presents the time-of-flight (and energy) spectrum of neutrons for the photo-fission of $^{232}$Th.

FIG. 2, which is taken from FIG. 4 of the Sargent et al. reference, displays the time-of-flight (energy) spectrum of prompt neutrons from photo-fission of $^{232}$Th at 77 degrees with respect to the direction of an incident 7.75 MeV. photon beam. At the top of FIG. 2 is the prompt neutron energy scale.

One outstanding feature of the neutron spectrum in FIG. 2 is the presence of neutrons at very high energy compared to an evaporation (thermal) spectrum with an average energy of approximately 1.14 MeV, as reported by Sargent et. al. from their analysis of the energy and angular distributions of the prompt neutrons from photon induced fission of $^{232}$Th. For example, the intensity at 6 MeV is considerable. The presence of a large number of neutrons at high energy results in part from the considerable boost in velocity transferred to the neutrons by the moving fragments. For example, if the velocity of the fragment corresponds to a kinetic energy of 1 MeV/nucleon, then a 1 MeV neutron emitted in the fragment center of mass frame of reference in the direction of fragment motion will have twice the velocity in the laboratory frame of reference and a kinetic energy of 4 MeV. This follows because the neutron velocity in the laboratory frame is the sum of the fragment velocity and the neutron velocity in the fragment frame. Since these are the same for the energies and directions considered in this example, the velocity is doubled. The kinetic energy varies as the square of the velocity. Hence the neutrons with 1 MeV in the fragment frame of reference have 4 MeV in the laboratory frame of reference. More generally, if the fragment velocity is V and the co-directional neutron velocity in the fragment frame is v, then the neutron velocity in the laboratory frame is V+v. The kinetic energy of the neutron in the laboratory frame is E=(m/2)(V$^2$+2Vv+v$^2$) or E=E$_f$(1+2(E$_n$/E$_f$)$^{0.5}$+E$_n$/E$_f$) where E$_n$ is the neutron kinetic energy in the fragment frame and E$_f$ is the kinetic energy of one nucleon of the fragment. Thus, in the above example, a neutron emitted in the fragment direction of motion at 2 MeV in the fragment center of mass frame of reference will have a laboratory kinetic energy of 5.8 MeV.

Energy conservation in the direct ($\gamma$, n) neutron production process does not allow the production of neutrons with an energy above E=E$_b$–E$_{th}$, where E$_b$ is the bremsstrahlung endpoint energy of the incident photon beam and E$_{th}$ is the ($\gamma$, n) threshold energy for producing neutrons from other relevant heavy elements. Therefore, detecting neutrons with energies above this value is definitive evidence of the presence of fission.

Since the ($\gamma$,n) threshold of $^{232}$Th is 6.438 MeV, a neutron energy of 6 MeV will not be possible from ($\gamma$, n) until the bremsstrahlung endpoint reaches 12.438 MeV. Also, even when the bremsstrahlung endpoint reaches that value, neutrons from the ($\gamma$, n) process will be very small in number because they can only be produced by the few photons at the bremsstrahlung endpoint energy.

These energetic considerations apply in a similar manner for all fissionable nuclear materials, in particular for those with Z≥89, the region of the actinides. In addition, and most importantly, most heavy elements such as Bi, Pb, W, Ta, etc. have isotopes with (γ, n) thresholds at or above 6.5 MeV. Therefore, finding neutrons with energies above $E=E_b-E_{th}$ where $E_{th}$ is in the range of 6 MeV constitutes a very definitive test for the presence of fissile material.

Another test to verify that the detected neutrons result from photo-fission is the sensitivity of the yield of neutrons at energies above $E=E_b-E_{th}$ to a modest increase in incident photon energy. In particular, measuring the increase in yield relative to the yield of neutrons below this energy is significant. The increase or relative increase in neutron yield is not substantial when the neutrons are emitted from photo-fission fission fragments because energetic considerations independent of the exact incident photon energy, such as the boost in velocity from fission fragment motion, are most important in determining the yield.

Figure 3:
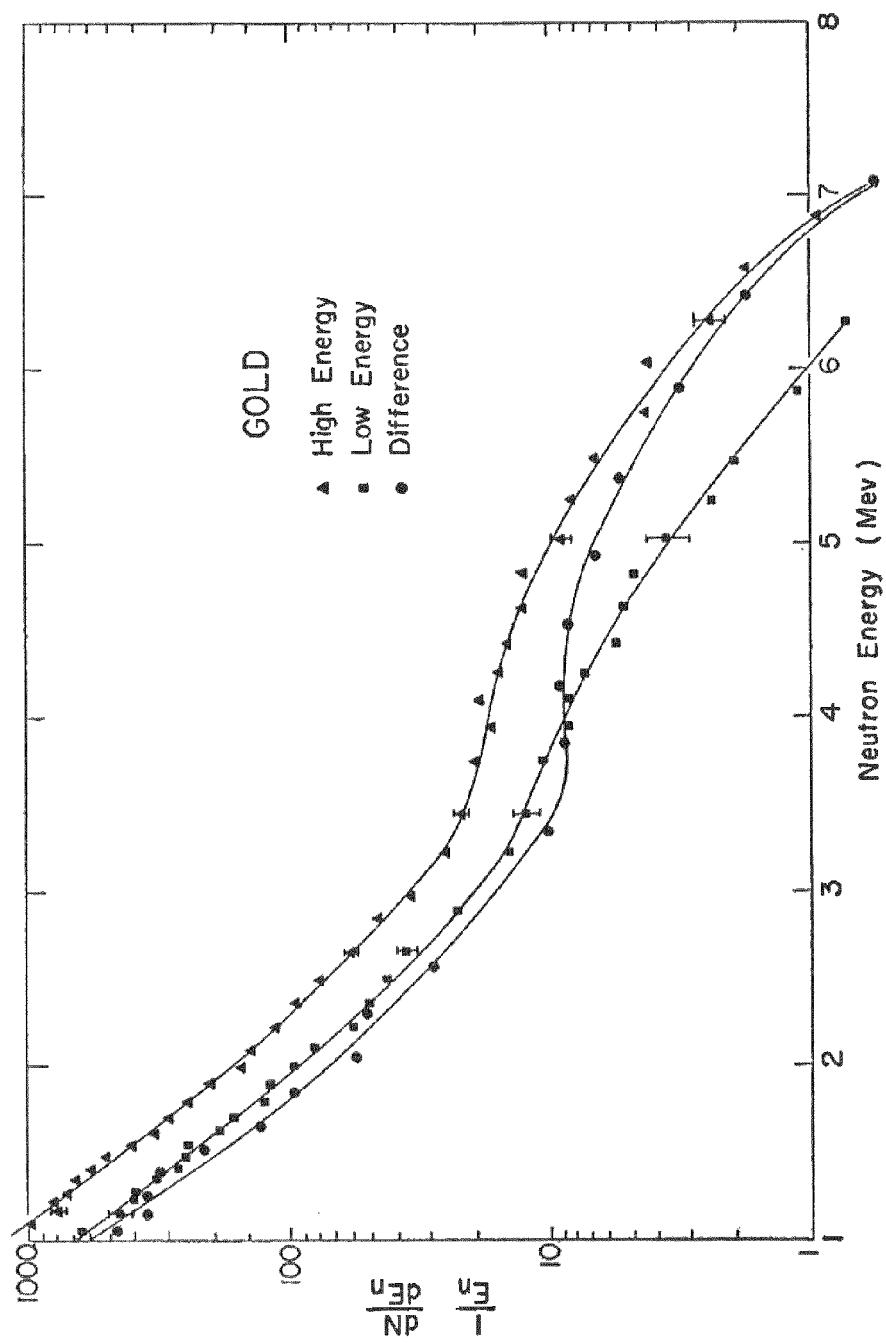
FIG. 3 shows the energy spectra of photo-neutrons produced by the ($\gamma$, n) process from gold for bremsstrahlung beams of 14.3 and 15.8 MeV endpoint energies.

FIG. 3 displays spectra of (γ, n) neutrons for gold. (It is FIG. 2 from W. Bertozzi, F. R. Paolini and C. P. Sargent, "Time-of-Flight Measurements of Photoneutron Energy Spectra", Physical Review, 119, 790 (1958)). FIG. 3 illustrates how the nature of the (γ, n) process causes neutrons produced by that process to be concentrated mostly at low energies. The data in FIG. 3 are normalized to yield the same number of neutrons from the (γ, n) process in a reference target of $^2$D with neutron energies $E_n > 1.4$ MeV. Because photon and neutron energy are uniquely related in the (γ, n) process in $^2$D, this normalization allows the formation of the difference photon spectrum (the difference between the high energy (15.8 MeV) bremsstrahlung spectrum and the low energy (14.3 MeV) bremsstrahlung spectrum), which corresponds to a broad band of photons centered at approximately 14.5 MeV and with approximately a 2 MeV half width. That is, the neutron energy spectrum produced by the difference in the neutron energy spectra at the two energies in FIG. 3 corresponds to photo neutrons produced by photons in the above energy band centered at approximately 14.5 MeV. FIG. 3 confirms that, because neutrons produced by the (γ, n) process are concentrated mostly at low energies, the contamination of a photo-fission spectrum by neutrons from the (γ, n) process is expected to be low at higher neutron energies, even when one looks at neutrons at energies below the $E=E_b-E_{th}$ cutoff established by the strict application of energy conservation.

The spectra in FIG. 3 show the rapid, almost exponential decrease of neutrons from the (γ, n) process with increasing neutron energy, in contrast to the neutron spectrum from the photo-fission (γ, f) of $^{232}$Th at 7.75 MeV bremsstrahlung energy as shown in FIG. 2. For gold the neutron spectrum from (γ, n) is nonexistent with if the bremsstrahlung spectrum endpoint is 7.75 MeV, since the (γ, n) threshold, $E_{th}$, is above 8 MeV. Even with a 12 MeV bremsstrahlung endpoint, the highest neutron energy from (γ, n) in gold would be less than 4 MeV., and neutrons in this energy range from (γ, n) would not be numerous because they would correspond to photons at the endpoint of the bremsstrahlung spectrum. The neutron yield from (γ, f) in $^{232}$Th is very large at 12 MeV bremsstrahlung for neutron energies above 6 MeV.

Table 1 gives the (γ, f) and the (γ, n) thresholds (in MeV) for some typical nuclei in the actinide region. The (γ, f) thresholds are from H. W. Koch, "Experimental Photo-Fission Thresholds in $^{235}$U, $^{238}$U, $^{233}$U, $^{239}$Pu and $^{232}$Th", Physical Review, 77, 329-336 (1950). The (γ, n) threshold of $^{207}$Pb is also listed, as it is a component in natural lead material that may be used as a shield against detection of fissile materials. The table shows the maximum neutron energy available from the (γ, n) process for bremsstrahlung end point energies up to 11 MeV, including for $^{207}$Pb. This energy is to be compared to the spectrum in FIG. 3 showing many neutrons with energies in excess of 6 MeV from $^{232}$Th photo-fission using bremsstrahlung of only 7.75 MeV. Even with an 11 MeV bremsstrahlung energy there are no neutrons above 5.7 MeV from any nucleus, and no neutrons above 4.26 from $^{207}$Pb, and those at or near these energies would be very few in number because they correspond to the photons at or near the end-point energy of the bremsstrahlung spectrum. It should be noted that the (γ, f) process increases in importance as the bremsstrahlung endpoint energy increases from 6 to 11 MeV because of the increasing cross section with energy and because of the increasing number of photons in the bremsstrahlung spectrum at lower photon energies where the (γ, f) cross section is sizable. The (γ, f) thresholds are almost all lower than the (γ, n) thresholds, and are all significantly lower than the (γ, n) threshold for $^{207}$Pb.

TABLE 1

Maximum Neutron Energies from (γ, n) for Selected Bremsstrahlung Energies and Isotopes.

| | | | Maximum (γ, n) Neutron Energy (MeV) Bremsstrahlung γ Endpoint Energy, $E_b$ (MeV) | | | | | |
|---|---|---|---|---|---|---|---|---|
| Element | (γ, f) Threshold (MeV) | (γ, n) Threshold (MeV) | 6 | 7 | 8 | 9 | 10 | 11 |
| $^{232}$Th | 5.40 ± 0.22 | 6.438 | — | 0.56 | 1.56 | 2.56 | 3.56 | 4.56 |
| $^{233}$U | 5.18 ± 0.27 | 5.759 | 0.24 | 1.24 | 2.24 | 3.34 | 4.34 | 5.34 |
| $^{235}$U | 5.31 ± 0.27 | 5.298 | 0.70 | 1.70 | 2.70 | 3.70 | 4.70 | 5.70 |
| $^{238}$U | 5.08 ± 0.15 | 6.154 | — | 0.85 | 1.85 | 2.85 | 3.85 | 4.85 |
| $^{239}$Pu | 5.31 ± 0.25 | 5.647 | 0.35 | 1.35 | 2.35 | 3.35 | 4.35 | 5.35 |
| $^{207}$Pb | — | 6.738 | — | 0.26 | 1.26 | 2.26 | 3.26 | 4.26 |

The data in Table 1 indicates how the yield of neutrons above a specified energy would change as the bremsstrahlung endpoint energy is changed. For $^{207}$Pb, Table 1 indicates, there would be no neutron yield above 4 MeV until the electron beam energy exceeded approximately 11 MeV. (For gold, as discussed above in connection with FIG. 3, the electron beam energy would have to exceed 12 MeV to provide a neutron yield above 4 MeV.) However, the yield of neutrons above 4 MeV for the actinides would be a strongly increasing function of electron beam energy starting below 6 MeV electron beam energy since the low (γ, f) threshold allows the photo-fission process to grow rapidly as more and more photons are available for photo-fission, all of them producing a neutron spectrum independent of photon energy and strongly populating the selected region of neutron energy (above 4 MeV for example). The (γ, n) process in the actinide examples shown in Table 1 or in other heavy metals such as $^{207}$Pb would not be a significant component of the total yield until the electron beam energy is well above 10 MeV since the process involves only the photons near the bremsstrahlung endpoint, $E_b$.

Figure 5A:
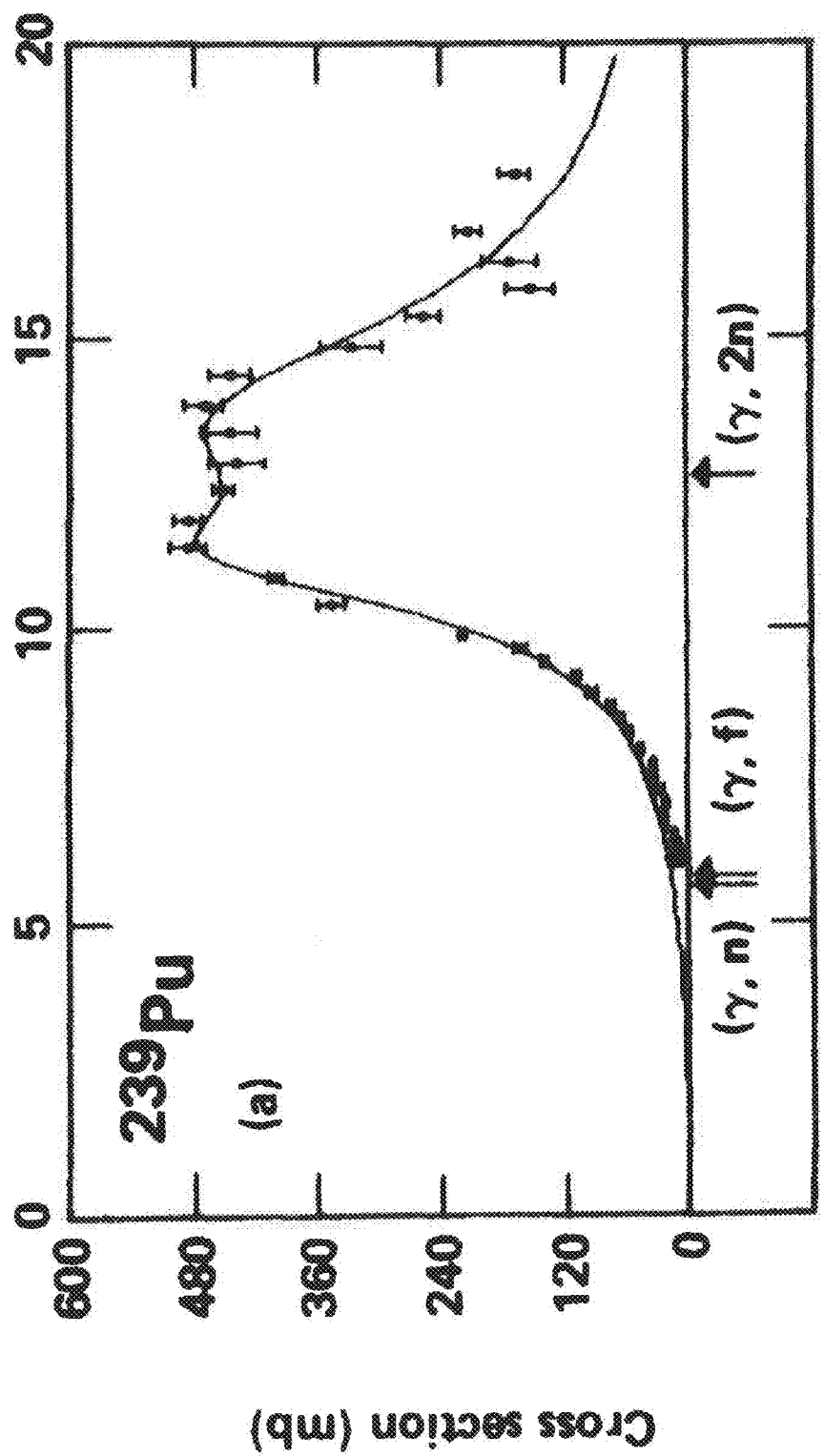
FIGS. 5A, 5B, 5C, and 5D display the photon induced reaction cross sections for $^{239}$Pu for the ($\gamma$, Total), ($\gamma$, n), ($\gamma$, 2n) and ($\gamma$, f) processes, respectively.
Figure 5B:
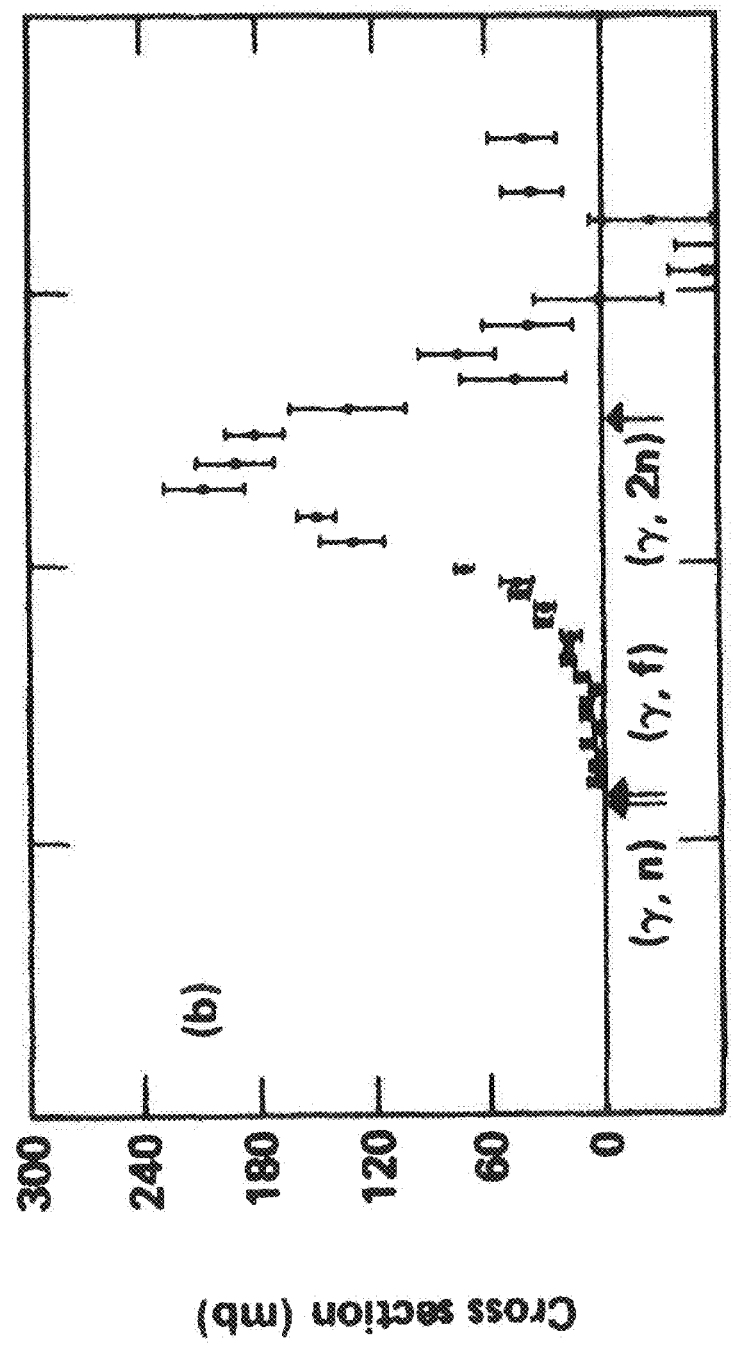
Figure 5C:
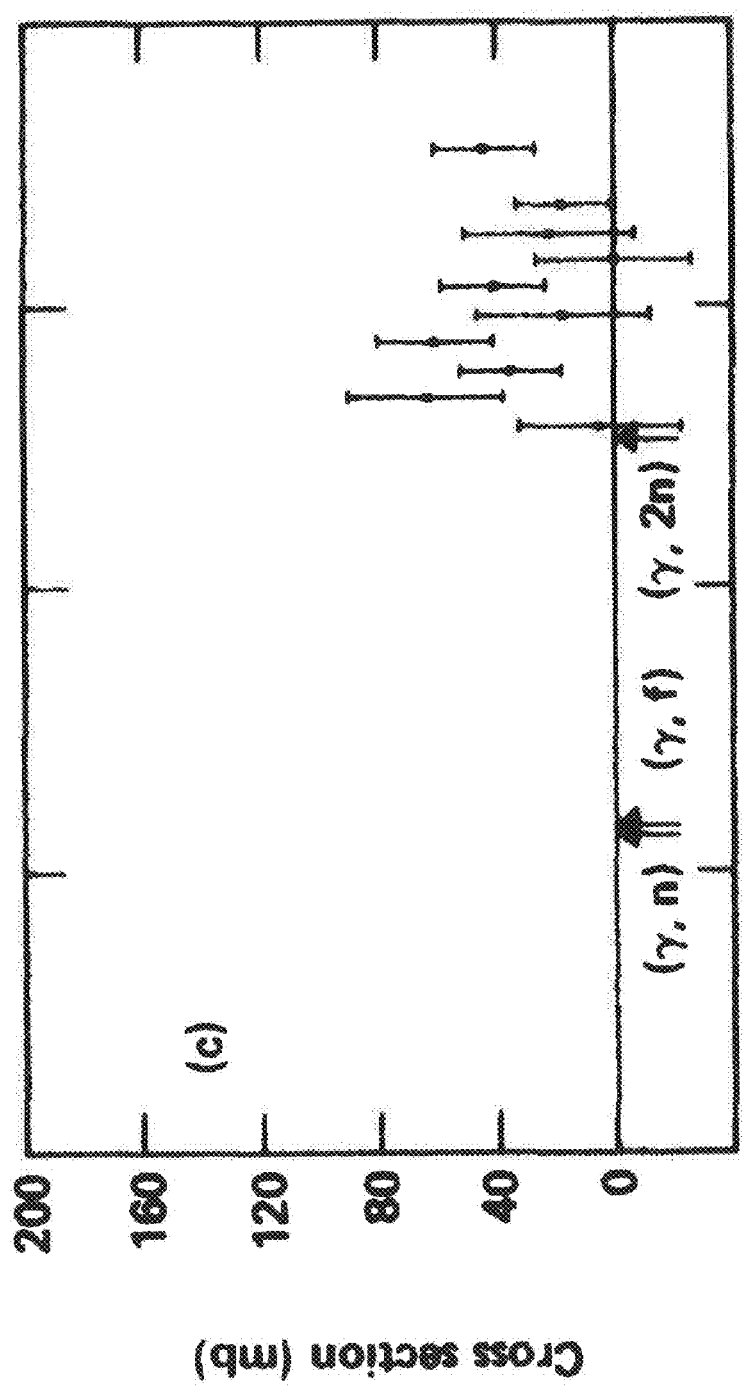
Figure 5D:
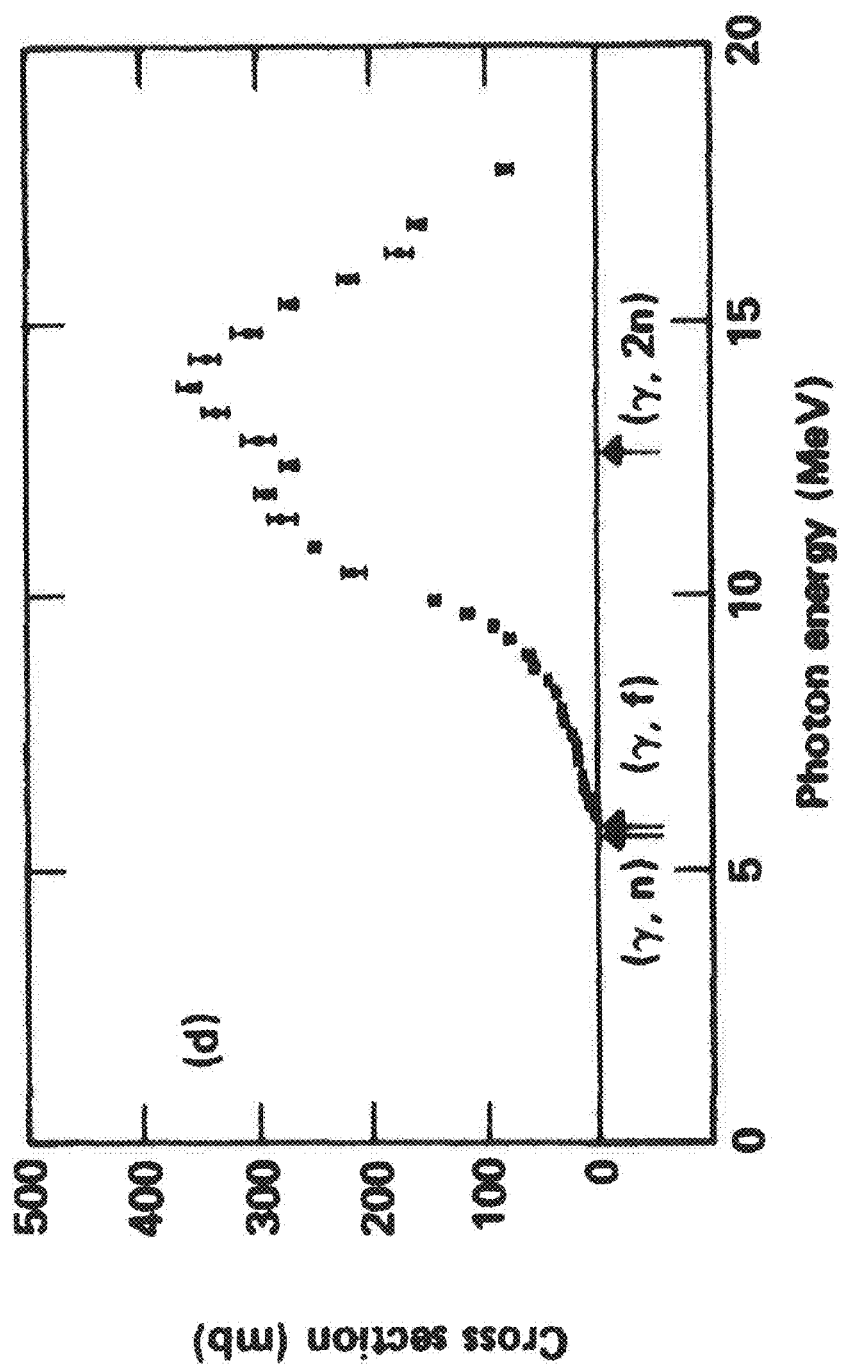

An additional point, which will be discussed further below, is that the photo-fission cross section is larger than the (γ, n) cross section over most photon energies by a considerable amount, as shown in FIGS. 5B and 5D. The neutrons from (γ, f) will dominate (γ, n) in most situations simply on the basis of the cross sections, aside from the other features discussed herein.

The data in Table 1 is based upon continuous bremsstrahlung spectra with specific endpoint energies, but a similar discussion applies to monochromatic photon beams. The neutron energy spectra from photo-fission retains the same dependence on neutron energy for different photon energies, but the total yield is modulated for monochromatic photons only by the cross section for (γ, f) at the specific photon energy. In contrast, the total yield for neutron production from a bremsstrahlung beam is modulated by the convolution of the bremsstrahlung spectrum with the (γ, f) cross section. The maximum neutron energy from (γ, n) dictated by energy conservation considerations for monochromatic incident photons follows just as discussed above.

Other energies than 4 MeV could be used as the "trigger" or cutoff for defining the presence of fissionable nuclear material. That is, for any specific electron beam energy, a "trigger" energy can be selected such that the presence of neutrons with an energy above that "trigger" energy will be energetically impossible for the (γ, n) process in relevant heavy materials such as $^{207}$Pb and therefore any neutrons detected could only originate from the photo-fission process in an actinide. The data in FIG. 2 show that there are many neutrons above 6 MeV from the (γ, f) process, and hence 6 MeV could be selected as a "trigger" energy. Other "trigger" energies are possible also; the choice is dependent on factors such as the speed of detection that is desirable, the false positives that are to be allowed, and the efficiency of detection that is desired.

In addition, the choice may be dictated by the specific nature of the cargo in a container, if the cargo is made of materials with high (γ, n) thresholds, such as copper, aluminum, steel or oxygen, then a lower trigger could be selected.

Conversely, hydrogenous material that naturally contains a small percentage of deuterium may be of concern because of its low threshold for the (γ, n) process, 2.2 MeV. However, because the energy release is shared almost equally by the neutron and proton, the maximum neutron energy is given by $E=(E_b-2.2)/2$ MeV and, for the example of an electron beam energy of 10 MeV, the maximum neutron energy is approximately 3.9 MeV and a 9.2 MeV photon results in a neutron energy of 3.5 MeV. Thus, a higher trigger may be appropriate A more important concern may be $^9$Be. It has a low (γ, n) threshold of only approximately 1.6 MeV and the energy sharing results in a neutron that has most of the available energy, $E=(8/9)(E_b-1.6)$ MeV is the maximum neutron energy available. For the example of $E_{b=}10$ MeV, the maximum neutron energy is approximately 7.5 MeV. This high energy could present a serious background. However, one could distinguish neutrons from actinide photo-fission from neutrons from the (γ, n) process in $^9$Be by taking advantage of the fact that the (γ, n) process follows the strict rule for conservation of energy, so that $E=(8/9)(E_b-1.6)$ defines the maximum neutron energy possible, while the photo-fission process has a neutron energy spectrum largely independent of the photon energy in the energy region under discussion, $E_b$ less than approximately 15 MeV. Therefore, neutrons at an energy greater than $E=(8/9)(E_b-1.6)$, where $E_b$ is the photon beam energy or bremsstrahlung endpoint energy, is proof of a fissile material. At $E_b$=10 MeV, the presence of neutrons above approximately 7.5 MeV would be proof. At $E_b$=8 MeV, neutrons above 5.7 MeV would be proof. Also, the prompt neutron energy spectrum is independent of the photon energy while the (γ, n) process in $^9$Be produces a neutron spectrum that is strongly dependent on photon energy. This difference also permits distinguishing the presence of a fissionable element from the presence of $^9$Be.

However, if there were concern that this measurement could not be reliably made, further steps could be taken. Operating at $E_b$=10 MeV, the maximum neutron energy from beryllium (γ, n) is approximately 7.5 MeV. By reducing the beam energy to 8 MeV, for example, the maximum energy neutron from beryllium (γ, n) would be reduced to 5.6 MeV but the photo-fission neutron energy distribution would be unchanged. If there are neutrons above 5.6 MeV the process is unquestionably photon induced fission. If there remains any doubt that neutrons are from fission, the photon beam energy can be further reduced. For example at 5 MeV photon or bremsstrahlung beam energy there will be little or no photo-fission. But beryllium (γ, n) will produce neutrons of up to approximately 3 MeV at that photon beam energy. The presence of these neutrons will clearly establish the presence of beryllium. From the yield of these neutrons, the contributions from beryllium to higher neutron energies when higher photon energies are used can be calculated, the neutron energy distribution from beryllium removed, and the remaining spectrum analyzed for the presence of actinide neutrons.

Fortunately, $^9$Be is almost unique in this category. There are a few other nuclei with relatively low (γ, n) thresholds; $^6$Li, $^{13}$C, $^{17}$O and $^{149}$Sm are notable among these with thresholds of 5.66, 4.95, 4.14 and 5.87 MeV, respectively. The same procedures outlined above can be used to eliminate these sources as contributors masking fissionable nuclei.

Figure 4A:
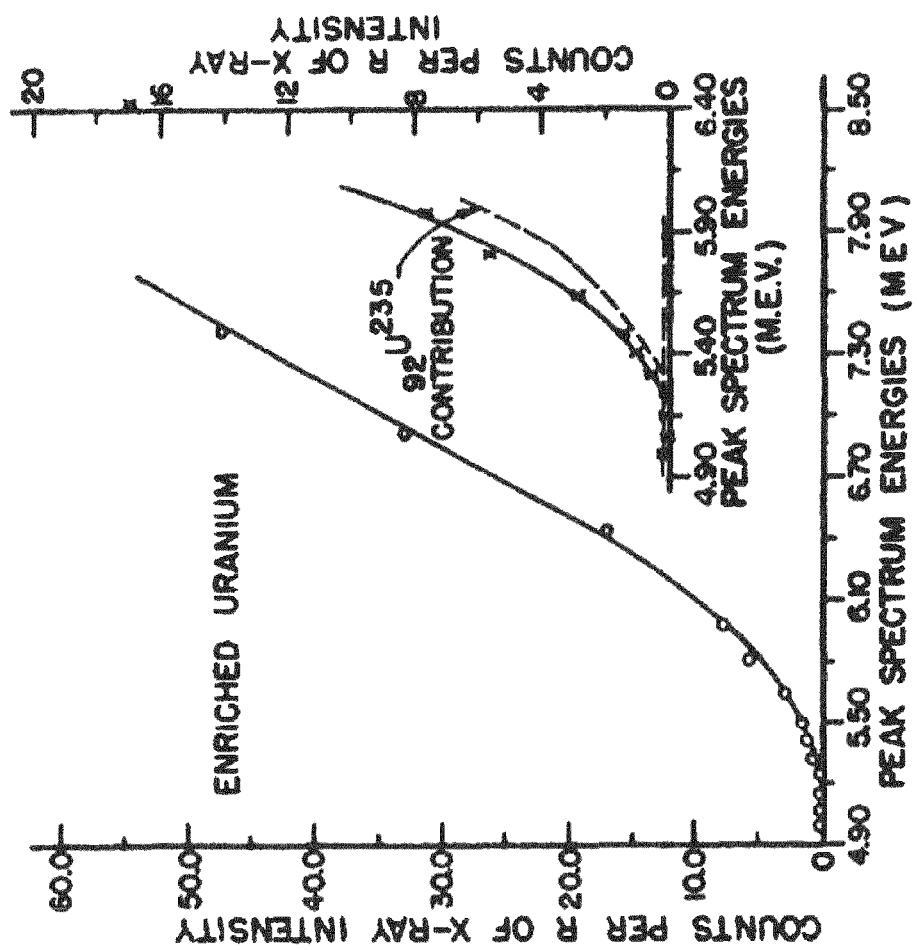
FIGS. 4A and 4B show the photo-fission yield as a function of bremsstrahlung endpoint energy in $^{235}$U and $^{239}$Pu, respectively.
Figure 4B:
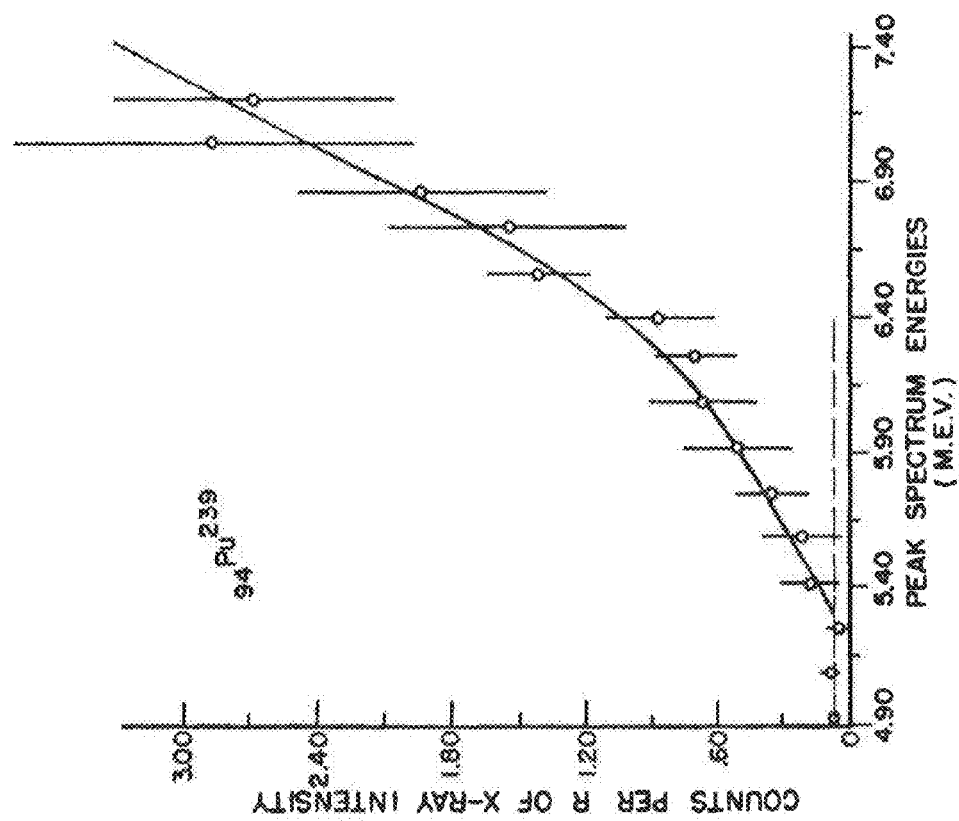

FIGS. 4A and 4B, from H. W. Koch, "Experimental Photo-Fission Thresholds in $^{235}$U, $^{238}$U, $^{233}$U, $^{239}$Pu and $^{232}$Th", Physical Review, 77, 329-336 (1950), FIGS. 4 and 5, display the yield of fission fragments as a function of bremsstrahlung endpoint energy ("Peak Spectrum Energies") for two isotopes, $^{235}$U (FIG. 4A) and $^{239}$Pu (FIG. 4B). These illustrate the rapid increase of the fission yield as a function of the energy of the electron beam used to produce bremsstrahlung. FIG. 4A also shows the dominance of the $^{235}$U contribution over the impurities of $^{238}$U in the enriched uranium sample. These data are based upon the detection of the actual photo-fission fragments. The yield of prompt neutrons follows approximately the same yield curve, since neutron emission in the photo-fission process is not dependent on the photon energy in the regions of interest below the Giant Electric Dipole Resonance at approximately 12 to 13 MeV photon energy. The emission of neutrons from the fragments is determined by the complex dynamics, discussed earlier, of splitting the fissioning nucleus into two fragments.

As a result, the shape of the yield curve of prompt neutrons of a given energy as a function of bremsstrahlung energy will be essentially independent of the neutron energy. That is, the yield curve for 6 MeV neutrons will have the same dependence on bremsstrahlung endpoint energy as the yield curve for 2 MeV, 3 MeV, 4 MeV and etc. neutrons. This is in contrast with the yield curves for neutrons from the (γ, n) process, which will start at the endpoint energy given by $E_b=E_{th}+E_n$, where $E_n$ is the neutron energy that is desired. They are thus displaced from the (γ, n) threshold energy, $E_{th}$, by the neutron energy, in contrast to the yield curves for (γ, f). This is a powerful signature that the neutrons detected are from photo-fission rather than from (γ, n).

FIGS. 5A through 5D display the photon induced reaction cross sections for $^{239}$Pu. They are taken from FIG. 7 of B. L. Berman, J. T. Caldwell, E. J. Dowdy, S. S. Dietrich, P. Meyer, and R. A. Alvarez, "Photofission and photoneutron cross sections and photofission neutron multiplicities for $^{233}$U, $^{234}$U, $^{237}$Np and $^{239}$U", Physical Review C Volume 34, Number 6, 2201-2214 (1986). FIG. 5A shows the total photon absorption cross section. FIG. 5B shows the partial cross section for (γ, 1n), single neutron emission. FIG. 5C shows the partial cross section for (γ, 2n), double neutron emission. FIG. 5D shows the partial cross section for (γ, f), photo-fission.

The photo-fission cross section (FIG. 5D) is larger than the (γ, n) cross section (FIG. 5B) over most photon energies by a considerable amount. This displays the feature common to the actinides that photo-fission is a strong and often dominant process from the (γ, f) threshold throughout much of the Giant Electric Dipole Resonance. Given that the prompt neutron multiplicities from photo-fission range from approximately 2.5 to more than 3, prompt neutrons from the photo-fission process will dominate the incident photon reaction channel by a large factor at all neutron energies. This feature facilitates identifying the presence of actinide fissionable material despite the potential presence of other heavy elements such as Pb, even without considering the energy-conservation constraints on neutron energy. The photon absorption process in most heavier nuclei is dominated by neutron emission, and the total yield is governed by the giant dipole sum rule that the integrated cross section is proportional to NZ/A, which is a slowly varying function. Since the location of the giant dipole resonance in energy also is a slowly varying function of nuclear mass, a yield of prompt neutrons from the photo-fission process that is 2.5 to 3 times the expected neutron yield from (γ, n) is a signal of photo-fission in that the (γ, f) neutron yield alone will produce a markedly higher photon absorption cross section than would (γ, n) for a given quantity of heavy material. That is, measuring the yield of neutrons per heavy nucleus per photon permits identifying photo-fission as present, if the quantity of heavy material present can be determined by measuring localized density by other methods.

The angular distribution of the prompt neutrons and the relationship of the neutron energy to the fragment angular distribution also are signatures of fissile material and the photofission process, and can be used in detection schemes.

The fragment angular distributions are not as distinct for odd-even nuclei as for even-even nuclei, in part because of the high population of spin states. Odd-even nuclei angular distributions are almost isotropic as reported by L. P. Geraldo, "Angular Distribution of the Photofission Fragments of $^{237}$Np at Threshold Energy", Journal of Physics G: Nuclear Physics, 12 1423-1431 (1986), which shows angular anisotropy of approximately 10% at 5.6 MeV, 6% at 6.61 MeV and ~2% at 8.61 MeV. These results are very much in contrast with the large anisotropy for fragments from the photo-fission of even-even nuclei where ground state spins are zero. Thus, once actinide photo-fission is detected, a nearly isotropic neutron angular distribution is an indicator of an odd-even fissile species such as $^{235}$U, $^{237}$Np and $^{239}$U. A strongly anisotropic neutron angular distribution would indicate an even-even fissile species such as $^{232}$Th and $^{238}$U. (See S. Nair, D. B. Gayther, B. H. Patrick and E. M. Bowey, Journal of Physics, G: Nuclear Physics, Vol. 3, No. 7, 1977 (pp 1965-1978) and references therein, for example.)

The energy distributions of the neutrons at various angles are themselves indicators of the fragment anisotropy, and thus of the type of nucleus. This fact was used in the analysis of the work by Sargent et al, discussed above. If the fragments are strongly anisotropic (even-even fissile species), then the energy spectra of the neutrons will show distinct differences at different directions with respect to the photon beam. As an example, if the fragments are strongly peaked at 90 degrees with respect to the photon beam, then the neutron spectrum at 90 degrees will exhibit to a different degree the boost in velocity due to the velocity of the fragments than the neutron spectrum at angles near 180 degrees or 0 degrees to the photon beam. However, if the fragment angular distribution is nearly isotropic (odd-even fissile species), then the energy distribution of the neutrons will be the same at all angles. In both situations, the higher energies reflect the motion of the fragments, but the contrast in the energy distribution of the neutrons at different angles will reflect the fragment anisotropy with angle.

The fragment angular distributions dominate the neutron angular distributions and the neutron energy distributions as a function of angle. The results of E. J. Winhold, P. T. Demos and I. Halpern, Physical Review, 87, 1139 (1952); E. J. Winhold and I. Halpern, Physical Review, 103, 990-1000 (1956); and, A. P. Berg, R. M. Bartholomew, F. Brown, L. Katz and S. B. Kowalski, Canadian Journal of Physics, 37, 1418 (1959) show the fragment angular distributions for various isotopes. The following abstract from Berg et al. is offered as a summary of the data in that paper:

Angular distributions of photofission fragments relative to the photon beam have been measured as a function of maximum bremsstrahlung energy in the range 6-20 MeV. The nuclides U-233, U-235, Np-237, Pu-239 and Am-241 give an isotropic distribution at all energies studied. The nuclides Th-232, U-234, U-236, U-238, and Pu-240 give anisotropic distributions which can be described by an equation of the form $W(\Theta)=1+\alpha \sin^2 \Theta$, where $\Theta$ is the angle between fragment and beam. The degree of anisotropy is large at low energy and falls rapidly as the energy is increased. At a given energy Th-232 has the greatest degree of anisotropy and Pu-240 the least.

The result quoted in the abstract is in basic agreement with that of the other papers referred to herein. In addition, some greater detail about the results from Berg et al. is shown in the two tables taken from that reference:

TABLE 2

Angular Distributions (from Berg, et al. Table I)
Angular distributions
Ratio, counts at 90°/counts at 0°*

| Nuclide | $E_o$† = 6.0 | $E_o$ = 6.5 | $E_o$ = 8.0 | $E_o$ = 10.0 | $E_o$ = 20.0 |
| --- | --- | --- | --- | --- | --- |
| U-233 | | | 1.048 ± 0.07 | 1.032 ± 0.04 | 0.994 ± 0.03 |
| U-235 | | | 1.024 ± 0.05 | | |
| Np-237 | | | 1.024 ± 0.10 | | |

TABLE 2-continued

Angular Distributions (from Berg, et al. Table I)
Angular distributions
Ratio, counts at 90°/counts at 0°*

| Nuclide | $E_o$† = 6.0 | $E_o$ = 6.5 | $E_o$ = 8.0 | $E_o$ = 10.0 | $E_o$ = 20.0 |
|---|---|---|---|---|---|
| Pu-239‡ | 1.034 ± 0.26 | 0.927 ± 0.12 | 1.002 ± 0.06 | 1.013 ± 0.05 | 0.952 ± 0.03 |
| Am-241 | | | 0.958 ± 0.07 | | |

*The ratio is the number of counts observed at 90° per unit X-ray dose divided by the number observed at 0° for the same dose.
†$E_o$ is the maximum energy in million electron volts of the bremsstrahlung spectrum.
‡The 45°/0° ratio at $E_o$ = 6.5 Mev was 1.09 ± 0.23.

TABLE 3

Corrected Values of α (from Berg, et al. Table VI)
Corrected values of α in W(Θ) = 1 + α sin² Θ

| $E_o$ | Th-232 | U-238 | U-236 | U-234 | Pu-240 |
|---|---|---|---|---|---|
| 6.0 | | 6.6 ± 2 | 6.0 ± 2.3 | | |
| 6.3 | | 6.7 ± 1.1 | | | |
| 6.5 | >25 | 4.4 ± 1.0 | 2.1 ± 0.4 | 2.3 ± 0.6 | 0.65 ± 0.20 |
| 7.0 | 11.0 ± 0.8 | 2.05 ± 0.24 | 1.33 ± 0.17 | 0.90 ± 0.16 | 0.49 ± 0.12 |
| 7.5 | 10.3 ± 1.6 | | | | |
| 8.0 | 4.9 ± 0.6 | 1.3 ± 0.1 | 0.79 ± 0.09 | 0.44 ± 0.08 | 0.29 ± 0.07 |
| 9.0 | 2.8 ± 0.4 | | 0.51 ± 0.07 | | |
| 9.4 | | 0.44 ± 0.04 | | | |
| 10.0 | 1.61 ± 0.12 | 0.41 ± 0.05 | 0.32 ± 0.06 | 0.17 ± 0.07 | |
| 14.0 | 0.46 ± 0.09 | 0.09 ± 0.04 | 0.04 ± 0.03 | | |
| 15.0 | | | | 0.02 ± 0.04* | 0.01 ± 0.03* |
| 20.0 | 0.14 ± 0.06 | 0.05 ± 0.03 | | | |

*These values, which do not differ from zero, have not been corrected for isotopic composition.

Table 2 ("Angular Distributions . . . ") shows that the ratio of events at 90 degrees to those at 0 degrees for the photo-fission of the odd-even isotopes shown is approximately equal to 1 over the energy range of the bremsstrahlung endpoints shown in the table. Thus, the value of b/a discussed earlier is 0 and the angular distribution is isotropic. Table 3 ("Corrected values . . . ") shows the fit to the normalized form of the angular distribution as exhibited in the table also as a function of bremsstrahlung endpoint. The derived angular distributions are clearly anisotropic. From these data, the quoted abstract, and the theoretical basis referred to in the references herein, the generalization is accurate; the odd-even actinides undergo isotropic photo-fission while the even-even actinides undergo anisotropic photo-fission. In particular, the result is experimentally demonstrated for the isotopes most likely to be used for a nuclear weapon, $^{235}$U, $^{239}$Pu and $^{237}$Np. These will undergo isotropic photo-fission, in contrast to $^{238}$U, $^{232}$Th and the other even-even isotopes that were measured.

FIG. 10, which displays the fission fragment angular distributions from photo-fission of an even-even nucleus, and FIG. 7, which displays the angular distributions of the prompt neutrons emitted from those fragments, demonstrate the general peaking of the fragment and neutron angular distributions at 90 degrees relative to the photon beam. The neutron yield at 150 degrees is approximately 20% less than that at 90 degrees and the shape of the distribution is approximately symmetric about 90 degrees. The fragment angular distributions show a larger anisotropy as expected because the neutron distributions are produced by folding the isotropic angular distributions in the fragment center of mass with the fragment distributions in angle. In contrast to these distributions, the isotopes $^{235}$U, $^{239}$Pu and $^{237}$Np (not shown), which may be used in the manufacture of weapons, display for the most part isotropic angular distributions of the photo-fission fragments as discussed above and the resulting angular distributions of the prompt neutrons also are isotropic.

Having reviewed the case of photon-induced fission in detail, we now turn to neutron-induced fission, the subject of this disclosure. As discussed earlier, the energy distribution of prompt neutrons emitted from neutron induced fission, photo-fission and spontaneous fission are very much alike and depend more on the specific nucleus undergoing fission than the energy of the initiating photon or neutron. These remarks pertain to fission initiating neutron energies of less than approximately 15 MeV and photon energies in or below the Giant Dipole region. The prompt neutrons from fission appear to be emitted for the most part from the fission fragments that have achieved their fully accelerated velocities. In the frame of reference of these fragments the prompt neutrons are emitted isotropically in angle with an energy distribution that is characterized by the energetic aspects of the fission process for the specific fissionable nucleus and is "thermal" in character. As a result of the boost from the fragment velocity, the neutron angular distributions also reflect the angular distributions of the fragments relative to direction of the initiating particle. In addition, the energy distribution of the prompt neutrons is also correlated to the angle of the prompt neutrons when the fission fragments are not emitted isotropically relative to direction of the initiating particle. These effects were demonstrated explicitly for photo-fission by the data of Sargent et al. and S. Nair, D. B. Gaythwer, B. H. Patrick and E. M. Bowey, Journal of Physics, G: Nuclear Physics, Vol. 3, No. 7, 1977 (pp 1965-1978). They are also demonstrated for neutron induced fission by the data of S. Nair and D. B. Gayther, Journal of Physics G: Nuclear Physics, Vol. 3, No. 7, 1977 (pp 949-964).

The angular distribution of the fission fragments in neutron induced fission plays a dominant role in determining the angular distribution of the prompt neutrons that are emitted.

Figure 13:
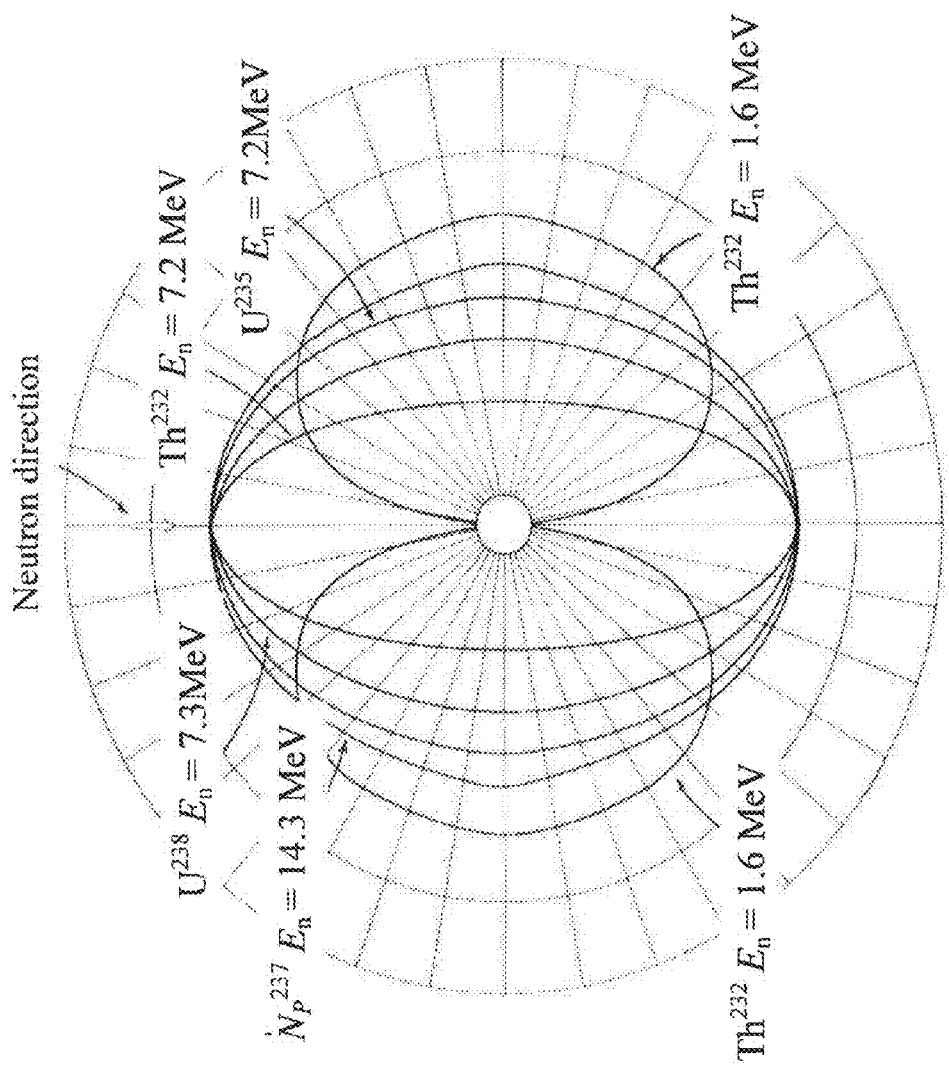
FIG. 13 shows the angular distribution of fission fragments from neutron induced fission.

For fission induced by un-polarized neutrons of low energy the fragments are emitted isotropically since only $J=\frac{1}{2}$ (angular momentum) is involved in the reaction process. As the energy of the initiating neutron increases the fragments can display anisotropic angular distributions. This is demonstrated by the work of S. Nair and D. B. Gayther, Journal of Physics G: Nuclear Physics, Vol. 3, No. 7, 1977 (pp 949-964) and also by other authors such as the data of Henkel and Brolley used by E. Hyde in UCRL 9065 and illustrated in FIG. 13 reproduced from "NUCLEI AND PARTICLES An Introduction to Nuclear and Subnuclear Physics", Emilio Segre, W. A. Benjamin, Inc., New York 1964 (page 502).

These data show that the fragment distributions from neutron induced fission become peaked forward and backwards at the higher energies as a result of the M=0 dominance of the orbital angular momentum projection relative to the neutron direction. At energies below ~3 MeV the angular distribution of the fragments varies with energy in a more irregular manner. Nevertheless, it is possible to calibrate these dependences accurately for each fissile isotope and the fragment angular distributions of prompt neutrons resulting from fast neutron induced fission can be used to specify further the differences between fissile isotopes. In fact, the prompt neutron angular distribution and its dependence on prompt neutron energy can be calibrated explicitly for different initiating neutron energies without reference to the fragment distributions. These differences in prompt neutron angular distributions and energy distributions correlated to angle can be used to distinguish different fissile isotopes.

Equally important in this disclosure is the fact that the energy of the initiating neutron can be controlled. For example the $D(D,n)^3He$ reaction will produce neutron energies of approximately 2.5 MeV for modest deuteron energies of 50 to 200 KeV. Using such a source would allow the detection of a fissile material simply by detecting neutrons from a container above 2.5 MeV. The neutron source would not be an important source of background.

Other reactions can be used to generate neutrons of a defined energy or range of energies. Among others, these include the $^3H(D,n)^4He$, (p,n), ($\alpha$,n) reactions and those involving the use of radioactive materials that emit neutrons or alpha particles used to bombard beryllium to produce neutrons. Some of these reactions and sources produce neutrons of an energy that is higher than a few MeV and the $^3H(D,n)^4He$ reaction is one of these with neutrons of approximately 14 MeV. The neutron source in these cases must be carefully shielded and collimated so as to not be mistaken as a fissile material because of the high energy neutrons contained in the spectrum. One technique that is used to control the energy of such neutron sources is to scatter these neutrons from a light nucleus such as hydrogen and by means of collimation and shielding only allow the neutrons scattered through a specific angle to impinge on the container being interrogated. This angle determines the final neutron energy and for example scattering from hydrogen at 45 degrees will reduce the neutron energy from its original energy E to E/2. Other such scattering situations will be understood by those skilled in the art and are included in this disclosure.

One embodiment of a detector system to carry out the methods described hereinabove with respect to photon-induced fission is described in U.S. patent application Ser. No. 12/139,050, to which this application claims priority, and which is incorporated herein. That embodiment requires a source of photons with energy capable of exceeding the ($\gamma$, f) threshold and a detector for neutrons. The photons may be monochromatic, may be produced by a source capable of variable energy, or may be distributed over a broad range of energy with a good definition of the highest energy possible, such as an electron-generated bremsstrahlung spectrum in accordance with the discussion above. When an accelerator is used to provide the electrons, the electron accelerator may have the capability to vary the energy of the electron beam from below the fission barrier (threshold) to higher energies in order to exploit all the modalities discussed above.

Any neutron detector that is capable of distinguishing neutron energy is appropriate. A detector that takes advantage of energy deposition, such as proton recoil from neutron elastic scattering in a hydrogenous scintillator, is a possible choice. A detector that measures a reaction energy induced by the neutron is another possible choice. A method of measuring neutron energy by time of flight is also an appropriate detection scheme. The energy resolution required for such detection methods will have to be sufficient to eliminate neutrons from the ($\gamma$, n) process in materials other than actinides, as discussed above.

Because the contamination of non-actinide ($\gamma$, n) can be controlled and rendered small by the choice of incident photon energy (or bremsstrahlung endpoint) and neutron energy measured, the resolution required is well within a number of measurement techniques. Specific resolutions required may depend in detail on the particular situation under consideration, but resolutions of approximately 0.5-0.75 MeV at 4 to 6 MeV neutron energy may be adequate.

A detection method may be required to operate in a possible flux of photons in some embodiments, these photons being produced by scattering from the material under study in the direction of the detectors. Photons may also be produced by natural radioactivity and cosmic rays. Therefore, the neutron detectors may have to be shielded using passive and active shielding techniques.

In addition, as a consequence of the above, a neutron detector may be required to distinguish between photons and neutrons. This can be accommodated by the reaction process used, the time of flight of the photons compared to neutrons and by the ability of the detector to distinguish between the deposition of energy by heavy particles (e.g., neutrons) compared to electrons. Organic and inorganic scintillators that have different decay times according to the density of ionization produced by the passage of a charged particle may be suitable. Separation of photons from neutrons may be achieved in such scintillators utilizing signal processing techniques that exploit these different charged particle responses.

Figure 12:
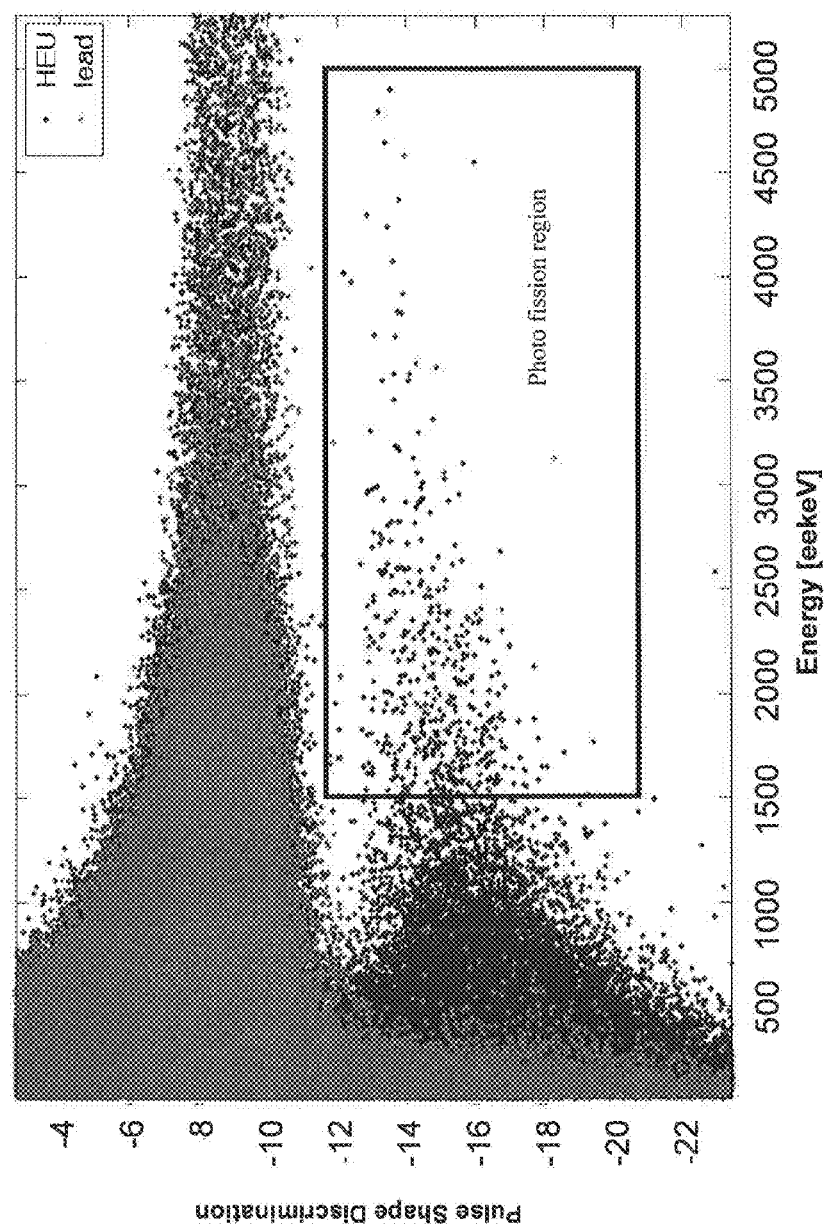
FIG. 12 shows pulse-shape discriminated energy spectra from HEU and Pb targets irradiated with a 9 MeV bremsstrahlung beam, illustrating the separation of photons from the neutron signal, and the separation of prompt photo-fission neutrons from neutrons produced by the ($\gamma$, n) process in Pb.

FIG. 12 demonstrates the energy separation of prompt neutrons from photon induced fission from neutrons produced from the ($\gamma$,n) reaction, when incident photon energies below 9 MeV are used. That Figure was obtained using 9 MeV bremsstrahlung beams produced at the CW S-DALI-NAC at the Technical University of Darmstadt. The spectra from Pb and highly enriched uranium (HEU) targets shown in FIG. 12 were obtained using the technique proposed for the CAARS PNPF module. An organic liquid scintillator was used to determine the energy deposited in the detector and to separate photon and neutron events. The lighter data points represent events from Pb (which as discussed above has a ($\gamma$,n) threshold of approximately 6.5 MeV for the $^{207}$Pb isotope) and the darker represent events from HEU (which has a photo-fission threshold of 5.5 MeV). The neutron events are grouped in the lower portion of the figure and are clearly differentiated from the photon events above. Within the neutron events, the box shows where the neutrons from prompt photo-fission in HEU appear unambiguously. A neutron signal in this region is an unambiguous signal of an actinide photo-fission event.

One exemplary embodiment of a system 600 for detecting fissile materials in a container by analyzing energetic prompt neutrons resulting from photon-induced fission is illustrated in FIG. 6. An electron beam 602 of energy $E_b$ is generated by an electron accelerator 601. The electron beam 602 makes bremsstrahlung radiation photons when it strikes a bremsstrahlung target 603 (also called the radiator). The electron accelerator 601 and radiator 603 optionally may be replaced by a source of monochromatic or nearly monochromatic photons. The optional collimator 604 collimates the bremsstrahlung radiation. A shield 605 may enclose the bremsstrahlung target 603 and electron accelerator 601. The photon beam 607 is directed onto a container 606 which is to be analyzed and which may contain fissile material 608. The distances of the fissile material 608 from (for example) three of the walls of container 606 are designated as x, y and z. A photon detector 609 placed after the container 606 optionally may be used to monitor the transmitted photon flux of photon beam 607. Detectors 610, 611, 612, and 613 may be placed at locations around the container 606 at approximately 90 degrees and at convenient back angles with respect to the collimated photon beam 607. The number and location of the detectors may be varied from that shown in FIG. 6 according to the principles and methods discussed above. In the illustrated embodiment, the detectors 610 and 611 may be placed at known distances L610 and L611 from the container 606 walls. The detectors 610, 611, 612, and 613 optionally may be surrounded by shielding (not shown) and by anti-coincidence counting systems (not shown) if desired. The detectors 610, 611, 612, and 613 themselves may be sensitive to neutron energy or they may be part of a system (such as one utilizing time-of-flight) that will provide a neutron energy for each detected neutron event. A beam dump 614 may be used to absorb the remaining photon flux after the photon beam 607 passes through the container 606 and its contents. The beam dump 614 and optional transmitted flux monitor, detector 609, may be shielded from direct view of the detectors as required. Signals from the detectors 609, 610, 611, 612, and 613 are connected by way of connections 615 to signal processing electronics and/or computer 616, which process the detector signals and optionally may relay them and/or processed information by way of connections 617 to a central control and data analysis and storage system (not shown.) Alternatively, the detector signals may be passed directly to the central system for processing and analysis.

As an alternative to determining neutron energy directly in the neutron detector, a low duty cycle LINAC (e.g. Varian linatron) or other suitable electron accelerator may be pulsed to permit a time of flight (TOF) technique. Compared to other detection techniques, such as pulse shape discrimination using a continuous incident photon beam, the TOF method is expected to have a higher efficiency for collecting high energy neutrons, reduced environmental background, and a higher likelihood of determining angular distributions. The TOF method may use a shortened pulse structure (10 ns) and gated detectors to reject gamma flash. The advantages inherent in the TOF method, combined with the modified LINAC and detectors, may partially compensate for the reduced duty cycle of commonly deployed pulsed accelerators.

In a time-of-flight (TOF) embodiment, the electron accelerator 601 or other source may be pulsed to produce electron beam 602 (pulsed on) for a time period T and turned off for a time long enough to have all the detectable neutrons (resulting from interactions of the photon beam 607 with the container 606 and its contents) pass through the detector(s). Then the electron beam 602 may be pulsed on again for a time period T. This sequence may be repeated until the desired detection data is obtained.

The electron accelerator 601 or some subsidiary target (not shown) near the bremsstrahlung target 603 or in the bremsstrahlung or photon beam 607 may provide a fiducial signal that informs the signal processing electronics and/or computer 616 when the photon beam 607 was generated. Neutrons generated by photofission in the fissile sample 608 travel to a detector in the time L/v where L is the distance from the fissile sample 608 to the detector in question and v is the neutron velocity. For detector 611, for example, which is opposite the fissile sample 608 at a right angle to the incident photon beam 607 in the embodiment shown, L=L611+y, the distance from the fissile sample 608 to the corresponding wall of the container 606 nearest detector 611. The velocity of the neutrons is given by $v=(2E/m)^{1/2}$, where E is the neutron kinetic energy and m is the neutron mass. The signal from detector 611 goes to the signal processing electronics and/or computer 616, which converts the difference between the fiducial signal arrival time and the detector 611 signal arrival time into the time-of-flight (TOF) of the neutron to the detector. Using the relation TOF=(L611+y)/v, the signal processing electronics and/or computer 616 calculates the neutron velocity and therefore its energy ($E=mv^2/2$) and records the data and also transfers it to a central control and analysis system (not shown).

The energy resolution of the detection system will depend on the TOF of the neutrons, T, L and the dispersion of the flight distance to different portions of the detectors. Those experienced in the art will recognize that these parameters, including the electron beam pulse width T, and the geometry of the system can be adjusted to achieve energy resolution adequate for the purposes of this disclosure.

The (narrow) photon beam 607 may be scanned across the container 606 sequentially to illuminate discrete columns where the fissile sample 608 may be located. This serves to better localize the position of any fissionable material and will reduce backgrounds from other neutron producing materials in a container. Alternatively, the photon beam 607 may be a wide fan-like beam encompassing a greater region of the container 606 with the fan opening out in the direction toward the detectors at 90 degrees, for example. This allows a broad scan region of the container but limited in the narrow direction. Such an embodiment would facilitate scanning the container in shorter times for fissile materials. It would detect fissile materials distributed over the dimensions of the fan beam. In this geometry x and y will not be known but they may be inferred from a comparison of the neutron energy spectra on both sides of the container since they should be very close to identical, especially at the highest energies. Starting with any assumption for "a", such as ½ the width of the container (x=y), the resulting spectra can be adjusted by varying "a" until the spectra are made to have the same high-energy shape.

The technology for short duration electron beam pulses is a well-known art, and pulses of a few nanoseconds are readily generated for high energy electron beams. Time of flight for a 1 MeV neutron over 1 m is 72 nanoseconds. Thus, flight distances of a few meters result in flight times (~71 nanoseconds for 6 MeV neutrons over a distance of 3 meters, for example) that allow beam pulse duration times of 10 to 20 nanoseconds to separate photo-fission neutrons from those from (γ, n) processes by energy selection.

Other specific embodiments are possible and some are mentioned herein as further illustrations of methods to articulate the concepts and methods described earlier.

The detectors 610, 611, 612, and 613 in FIG. 6 can be any that are capable of unambiguously detecting a neutron. Rather than measuring the neutron time of flight to determine its energy, it would suffice in some applications to only specify that the event is definitely a neutron and that the energy is greater than a defined amount. This would characterize the neutron energy as above a defined quantity. Several such neutron energies may be involved. Together with control of the electron beam energy or photon energy as discussed above, determining the number of neutrons with energies above certain preset quantities will classify the neutrons as from photo-fission. As discussed above, other processes such as (γ, n) will not be possible at neutron energies greater than $E=E_b-E_{th}$, where $E_b$ is the bremsstrahlung endpoint or the photon energy and $E_{th}$ is the threshold for (γ, n) for relevant non-actinide materials that may be present and need to be distinguished from the suspected actinide.

As discussed above, the energy distribution of neutrons from photo-fission is very independent of the energy of the photons used to induce photo-fission in the photon energy regions discussed herein, in or below the Giant Electric Dipole Resonance. Another embodiment uses this fact to determine whether the neutrons originate from photo-fission. Varying the photon energy or the bremsstrahlung endpoint energy will not substantially alter the energy distribution of the neutrons from photo-fission. However, this is not true for other processes such as (γ, n), especially in the higher regions of neutron energy, as a result of energy conservation and the requirement $E=E_b-E_{th}$ discussed earlier. Therefore, measuring the energy distribution of the neutrons for different photon energies, and comparing the results, can identify actinide photo-fission. Alternatively, measuring and comparing the number of neutrons above a certain energy as the photon energy is changed can achieve the same result.

Another embodiment would measure the neutron yield at a given neutron energy, as the photon energy is varied, and would do this for several neutron energies. This would generate yield curves for neutrons of the given energies as a function of photon energy. Because the neutron energy spectra from photon-induced fission is independent of the incident photon energy, the same yield curve as a function of photon energy would result for all neutron energies if the spectrum is dominated by photo-fission. However, if the neutron spectrum originates from (γ, n) for relevant non-actinide materials, each neutron energy has a yield curve as a function of photon energy displaced in photon energy by that explicit neutron separation energy, in particular for the neutrons at the highest energy possible. Once again this follows from energy conservation.

Neutron detection can be based on reaction energies between the neutrons and the component materials in the detector. Detectors of such a nature may sometimes but not always be called "threshold detectors" because a reaction will occur only if the neutron energy is greater than a certain amount. Examples of such reactions include but are not limited to (n, n'γ), (n, n'f), (n, n'p), (n, n'd) and (n, n't). Detection of the event may be based on, but not limited to, the detection of: a scintillation event and measuring the deposited energy; the charge created by ionization in a material and measuring the total charge; and, the detection of radioactive nuclei, wherein the radioactivity would be induced only if the neutron energy (energies) were greater than a certain value (or values). All such methods are included in the embodiments described in this disclosure.

As discussed above, some commercially available plastic and liquid scintillators can identify neutrons unambiguously using suitable signal processing techniques. Such detectors also have fast enough time response to qualify for the purposes herein and these will be known to those skilled in the art. Such detectors operate in part as proton recoil detectors, based on the energy imparted to protons by the elastic scattering of neutrons from the protons in the hydrogenous material. Therefore, in part, they can function as "threshold detectors" as discussed above, as well as providing the time for an event in a detector and identifying the event as a neutron. Such detection methods are part of the embodiments described herein.

Delayed neutrons following beta decay can also be detected by the methods discussed herein and serve as a method of detecting fissile materials. They will be less abundant than prompt neutrons by a very large factor, as discussed above. In most cases their presence can be used as a further detection method to augment the embodiments discussed herein. They can be distinguished from prompt neutrons by several techniques. Using TOF with a pulsed beam set to measure prompt neutrons, delayed neutrons appear as a uniform distribution in time that builds up with exposure time or the number of pulses in the TOF embodiment discussed above. The time for buildup of the delayed neutron signal is characteristic of beta-decay lifetimes. If the beam is turned off they will diminish in times characteristic of beta-decay lifetimes. The presence of the delayed neutrons may be neglected in many situations as a minor contribution. In some cases they may be used as an aid to the detection of fissile material. In all situations, the presence of delayed neutrons may be accounted for and the results corrected accordingly if the correction is required by these embodiments.

The photon beams may be of the pulsed variety described above in discussing TOF embodiments, or they may be of continuous character as from continuous duty radiofrequency accelerators, DC accelerators or similarly functioning photon sources of a monochromatic or nearly monochromatic nature.

Another scan embodiment would employ a very broad beam geometry in all directions transverse to the beam direction with collimation so as to limit the beam size to that of the container width in its largest manifestation. This embodiment would be very effective in the detection of fissile materials dispersed in small samples over a large volume, such as thin sheets broadly distributed over a large region of the container or small pellets broadly distributed.

Many beam geometries are possible, each with specific advantages for certain situations as will be recognized by those skilled in the art, and they are all included in this disclosure.

In order to carry out scanning of containers as rapidly as possible, it may be preferable to carry out an initial scan with a low threshold or trigger neutron detection energy, in order to maximize the signal from photofission, even at the cost of obtaining a signal from (γ, n) processes. If no events are recorded from the container or a portion thereof in an appropriate interval, or no events above an acceptable background, the scan can be continued to a further portion of the container, or the container can be passed on if the entire container has been scanned. If events are detected, the threshold or trigger neutron detection energy can be increased, and the container or portion thereof rescanned, using the higher neutron threshold or trigger detection energy to reduce or eliminate the contamination from the competing (γ, n) processes. Alternatively, of course, other of the methods set forth herein for discriminating between photofission and (γ, n) processes can be employed in the rescan.

Because angular distributions may be difficult to measure given the differential absorption and scattering of different cargo loadings, it is important to recognize that, as discussed above, if the energy distribution of the prompt neutrons is independent of angle relative to the photon beam, then the fragments are emitted isotropically and the fissile material is an odd-even isotope: however, if the prompt neutrons have a spectrum with greater population at the higher energies at 90 degrees to the photon beam relative to the prompt neutron spectrum at large angles near 180 degrees, then the fragments have an angular distribution peaking at 90 degrees and the fissile material is an even-even isotope. Therefore, measuring the neutron energy distribution at two angles will enable this determination to be made.

Another embodiment removes the uncertainty in the energy distribution and angular dependencies of the prompt neutrons caused by the differential absorption along different paths that neutrons take in traversing a container to the different detectors. This embodiment directs the photon beam into the container in different directions. For example, in one arrangement the photon beam may enter the container from the top and the neutron detectors view the neutrons at 100 degrees to the beam and at 170 degrees from the beam. By altering the photon beam direction to enter from the side of the container the detectors change roles. That one previously at 100 degrees is now at 170 degrees and the one previously at 170 degrees is now at 100 degrees. However, the differential aspects of neutron absorption remain exactly the same. The two measurements now provide a clear indication of the influence on the neutron energy distribution of the angle of emission of the neutron relative to the photon direction as well as the angular distribution of the neutrons relative to the photon beam direction. As one particular feature, if the photo-fission process is isotropic the relative neutron yields in the detectors will not change. A change indicates anisotropy in the original photo-fission process.

Figure 8A:
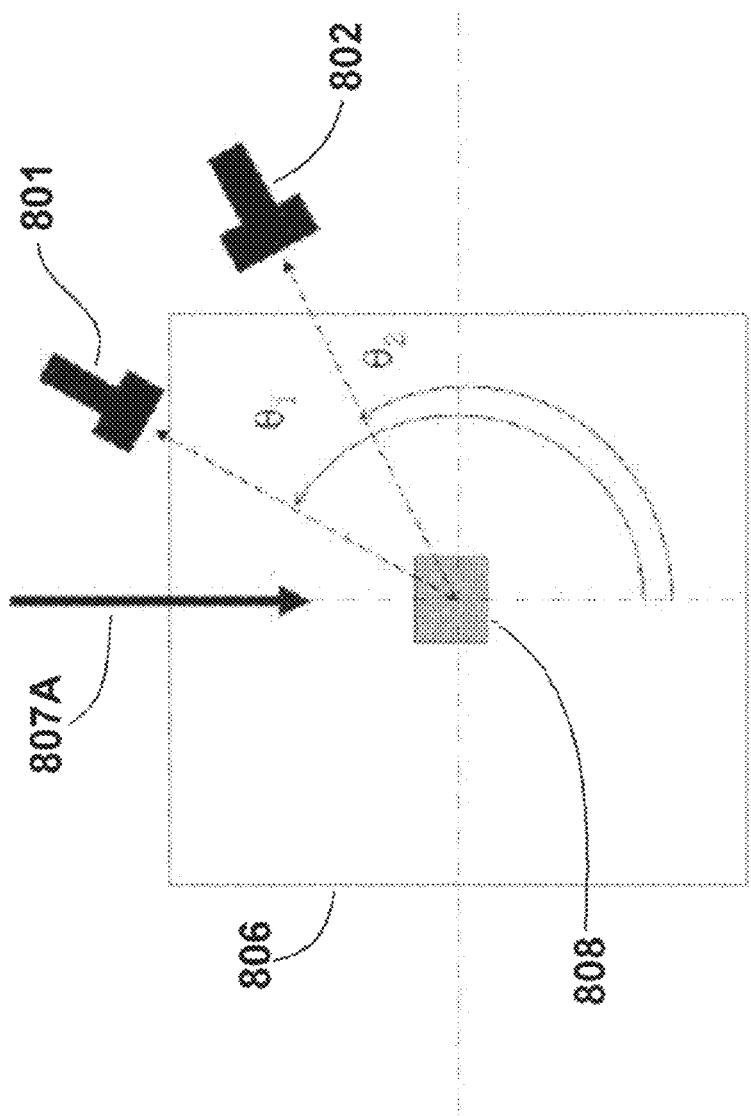
FIGS. 8A and 8B are schematics showing two beam positions for detecting neutrons produced by fission fragments from photon-induced fission with the angles for the detectors relative to the beam interchanged.
Figure 8B:
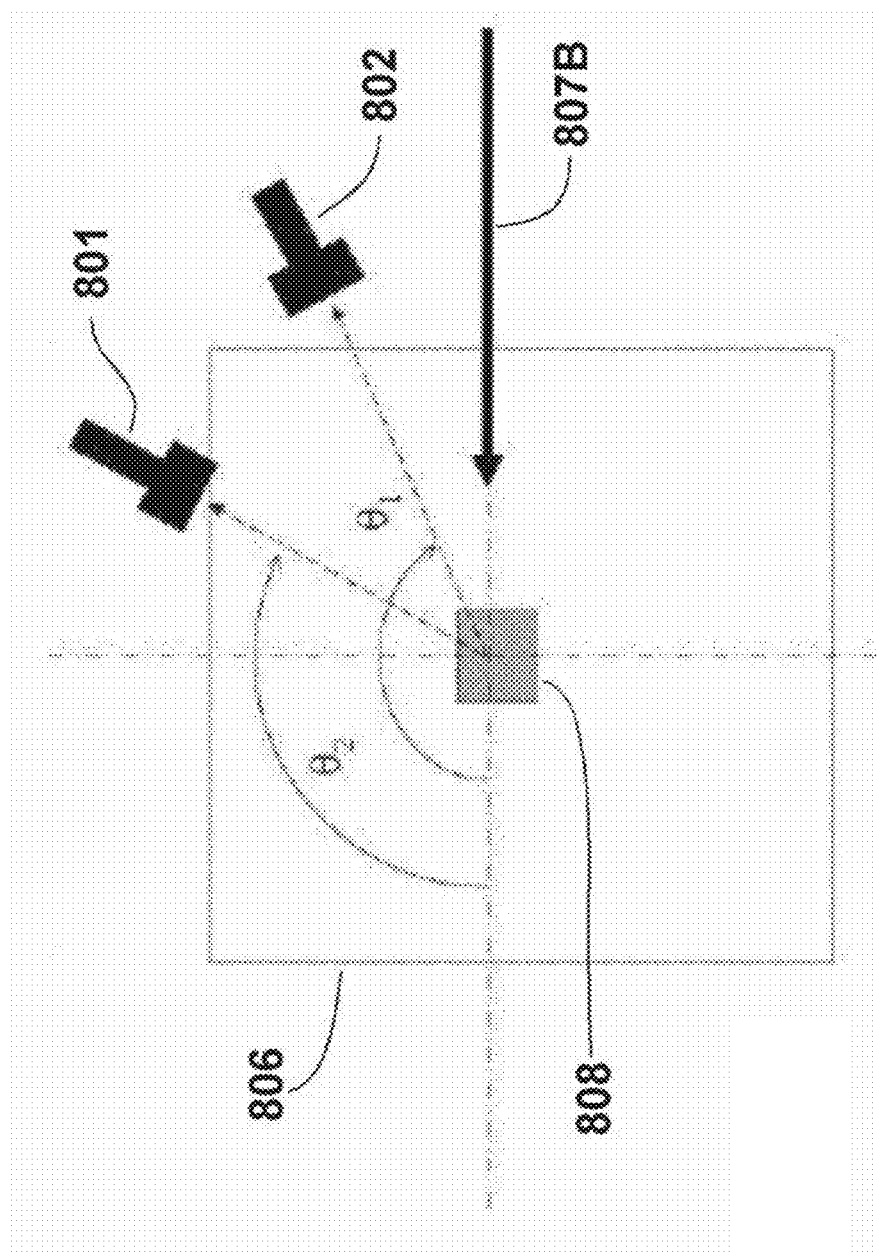

This process can be generalized for other angles as well. For example, FIGS. 8A and 8B, each show a container 806 with fissile material 808. A first neutron detector 801 is shown in a first location and a second neutron detector 802 is shown in a second location. In FIG. 8A, a photon beam 807A irradiates the container 806 from a first direction (direction 1). In FIG. 8B, a photon beam 807B irradiates the container 806 from a second direction (direction 2) For each of the two photon beam directions, the neutron detectors 801 and 802 interchange angles relative to the photon beam (807A or 807B) direction. For beam direction 1, first neutron detector 801 is at angle $\theta_1$ and second neutron detector 802 is at angle $\theta_2$. For beam direction 2, first neutron detector 801 is at angle $\theta_2$ and second neutron detector 802 is at angle $\theta_1$. $I_1$ and $I_2$ are the photon beam intensities at the target 808 (which may be a fissile material) for photon beam directions 1 and 2 respectively. If $S(E,\theta)$ is the energy spectrum of neutrons produced in direction $\theta$, the neutrons detected by the two detectors with photon beam direction 1 are described by the measured functions $F_i(E, \theta_j)$:

$F_1(E,\theta_1)=I_1 \times A_1(E) \times S(E,\theta_1)$ for first neutron detector 801; and, $F_2(E,\theta_2)=I_1 \times A_1(E) \times S(E,\theta_1)$ for second neutron detector 802.

The neutrons detected by the two detectors with beam in direction 2 are:

$F_1(E,\theta_2)=I_1 \times A_1(E) \times S(E,\theta_2)$ for first neutron detector 801; and, $F_2(E,\theta_1)=I_2 \times A_2(E) \times S(E,\theta_1)$ for second neutron detector 802.

The attenuation factors $A_1$ and $A_2$ remain invariant to the beam position and the ratio can be formed to eliminate these factors so that:

$\{S(E,\theta_1)/S(E,\theta_2)\}^2 = \{F_1(E,\theta_1) \times F_2(E,\theta_1)\}/\{F_2(E,\theta_2) \times F_1(E,\theta_2)\}$. (Equation 1)

Thus, $S(E,\theta_1)$ and $S(E,\theta_2)$ are related via measured quantities and can be compared directly. A person skilled in the art will be able generalize this technique to more than two detectors and this embodiment is intended to contain all these variations This technique, wherein the absorptive properties of the material in the container may be removed from consideration, has applicability for both photon-induced and neutron-induced fission.

Although the methods and systems discussed above have been described relative to photon-induced fission, they may be adapted and modified for application to neutron-induced fission. This is particularly true since the dynamics of these fission processes are regulated by the fact that these actinide nuclei are deformed with a low energy barrier to fission. Therefore, initiating fission only requires a small perturbation from the ground state to overcome the fission barrier. Given that the ground state is essentially a meta-stable state as evidenced by the existence of spontaneous fission, the details of the perturbation resulting in fission are not important to many properties of the final state. Hence, many of the details of fission depend most strongly on the nature of the fissioning nucleus, not the initiating particle or perturbation.

The one strong exception to this ideal is the angular distribution of the fragments relative to the direction of the initiating particle. For the energy range discussed herein photon induced fission produces fragments that favor emission at 90 degrees to the photon beam, in particular for even-even actinides as discussed earlier. In contrast, neutron induced fission has a different behavior. Thermal neutrons induce fission that is largely isotropic with respect to fragment emission. As the neutron energy increase, we have shown above that the fragments in neutron induced fission can be emitted preferentially at 90 degrees and also forward and backwards with respect to the neutron beam. These behaviors reflect the importance of angular momentum preferences in the fissioning nuclei for neutrons of approximately 1 to 3 MeV while at higher energies the dominance of M=0 states in orbital angular momenta of the initiating neutron play a dominant role. Thus, with consideration of the details of the fission fragment angular distributions embodiments for photon induced fission may be adapted to apply to neutron induced fission with the replacement of the photon beam by a neutron beam.

One exemplary embodiment of a system 900 for detecting fissile materials in a container by analyzing energetic prompt neutrons resulting from neutron-induced fission is illustrated in FIG. 9. A neutron beam 902 of energy $E_b$ is generated by a neutron generator 901. The neutron beam may pass through a target (neutron filter) 903 to eliminate in some situations thermal neutrons generated within the shielding enclosure 905. The neutron generator may be a source of monochromatic or nearly monochromatic neutrons or may be replaced by such a source using radioactive materials. The optional collimator 904 collimates the neutron beam. A shield 905 may enclose the target 903 and neutron generator 901. The collimated neutron beam 907 is directed onto a container 906 which is to be analyzed and which may contain fissile material 908. The distances of the fissile material 908 from (for example) three of the walls of container 906 are designated as x, y and z. A detector 909 placed after the container 906 optionally may be used to monitor the transmitted neutron flux of neutron beam 907. Detectors 910, 911, 912, 913 may be placed at locations around the container 906 at approximately 90 degrees and at convenient back angles with respect to the collimated neutron beam 907. The number and location of the detectors may be varied from that shown in FIG. 9 according to the principles and methods discussed above. In the illustrated embodiment, the detectors 910 and 911 may be placed at known distances L910 and L911 from the container 906 walls. The detectors 910, 911, 912, 913 optionally may be surrounded by shielding (not shown) and by anti-coincidence counting systems (not shown) if desired. The detectors 910, 911, 912, 913 themselves may be sensitive to neutron energy or a minimum neutron energy or they may be part of a system (such as one utilizing time-of-flight) that will provide a neutron energy for each detected neutron event. A beam dump 914 may be used to absorb the remaining neutron flux after the neutron beam 907 passes through the container 906 and its contents. The beam dump 914 and optional transmitted flux monitor, detector 909, may be shielded from direct view of the detectors as required. Signals from the detectors 909, 910, 911, 912 and 913 are connected by way of connections 915 to signal processing electronics and/or computer 916, which process the detector signals and optionally may relay them and/or processed information by way of connections 917 to a central control and data analysis and storage system (not shown.) Alternatively, the detector signals may be passed directly to the central system for processing and analysis.

In an embodiment the neutron beam 902 is not collimated to a very narrow cone and irradiates all or a substantial region of the container. In another embodiment, the neutron beam 902 initially may irradiate all or a substantial region of the container, but may be collimated to a narrow beam to localize detected fissionable material if the initial analysis with the broader beam indicates the presence of nuclear material in the container.

In a time-of-flight (TOF) embodiment, the neutron generator 901 is pulsed to produce neutron beam 902 (pulsed on) for a time period T and turned off for a time long enough to have all the detectable neutrons (resulting from interactions of the incident neutron beam 907 with the container 906 and its contents) pass through the detector(s). Then the neutron beam 902 may be pulsed on again for a time period T. This sequence may be repeated until the desired data is obtained.

The neutron generator 901 or some subsidiary target (not shown) near the neutron filter 903 or in the neutron beam 907 may provide a fiducial signal that informs the signal processing electronics and/or computer 916 when the neutron beam 907 was generated. Neutrons generated by neutron induced fission in the fissile sample 908 travel to a detector in the time L/v where L is the distance from the fissile sample 908 to the detector in question and v is the neutron velocity. For detector 911, for example, which is opposite the fissile sample 908 at a right angle to the incident neutron beam 907 in the embodiment shown, L=L911+y, the distance from the fissile sample 908 to the corresponding wall of the container 906 nearest detector 911. The velocity of the neutrons is given by $v=(2E/m)^{1/2}$, where E is the neutron kinetic energy and m is the neutron mass. The signal from detector 911 goes to the signal processing electronics and/or computer 916, which converts the difference between the fiducial signal arrival time and the detector 911 signal arrival time into the time-of-flight (TOF) of the neutron to the detector. Using the relation TOF=(L911+y)/v, the signal processing electronics and/or computer 916 calculates the neutron velocity and its energy ($E=mv^2/2$) and records the data and also transfers it to a central control and analysis system (not shown).

The energy resolution of the detection system will depend on the TOF of the neutrons, T, L and the dispersion of the flight distance to different portions of the detectors. Those experienced in the art will recognize that these parameters, including the neutron beam pulse width T, and the geometry of the system can be adjusted to achieve energy resolution adequate for the purposes of this disclosure.

The (narrow) neutron beam 907 may be scanned across the container 906 sequentially to illuminate discrete columns where the fissile sample 908 may be located. This serves to better localize the position of any fissionable material and will reduce backgrounds from other neutron producing materials in a container. Alternatively, the neutron beam 907 may be a wide fan-like beam encompassing a greater region of the container 906 with the fan opening out in the direction toward the detectors at 90 degrees, for example. This allows a broad scan region of the container but limited in the narrow direction. Such an embodiment would facilitate scanning the container in shorter times for fissile materials. It would detect fissile materials distributed over the dimensions of the fan beam. In this geometry x and y will not be known but they may be inferred from a comparison of the neutron energy spectra on both sides of the container since they should be very close to identical, especially at the highest energies. Starting with any assumption for "a", such as ½ the width of the container (x=y), the resulting spectra can be adjusted by varying "a" until the spectra are made to have the same high-energy shape.

The width of the neutron beam in time T is determined in part by the desired neutron energy resolution.

The technology for short duration neutron beam pulses is a well-known art, and pulses of a few nanoseconds are commonly generated by generators of neutron beams. The technology for short duration ion beams used in neutron generators is a well-known art. Time of flight for a 1 MeV neutron over 1 m is 72 nanoseconds. Thus, flight distances of a few meters result in flight times (~71 nanoseconds for 6 MeV neutrons over a distance of 3 meters, for example) that allow beam pulse duration times of 10 to 20 nanoseconds to separate neutrons of different energies for the purposes of this disclosure.

Other specific embodiments are possible and some are mentioned herein as further illustrations of methods to articulate the concepts and methods described earlier.

The neutron beams may be of the pulsed variety described above, or they may be of a continuous character as from continuous duty radiofrequency accelerators, DC accelerators or from similarly functioning neutron sources of a monochromatic or nearly monochromatic nature with a well defined highest energy. These embodiments include all such sources to be applied, as anyone skilled in the art will understand.

These embodiments include a wide range of neutron beam geometries. One embodiment employs a well-collimated beam scanned across the face of a container. This serves to better localize the position of any fissionable material and will reduce backgrounds from other neutron producing materials in a container.

Another embodiment will employ a fan shaped beam allowing a broad scan region of the container but limited in the narrow direction. Such an embodiment would facilitate scanning the container in shorter times for fissile materials. It would detect fissile materials distributed over the dimensions of the fan beam.

Another scan embodiment employs a very broad beam geometry in all directions transverse to the beam direction with collimation so as to limit the beam size to that of the container width in its largest manifestation. This embodiment would be very effective in the detection of fissile materials dispersed in small samples over a large volume, such as thin sheets broadly distributed over a large region of the container or small pellets broadly distributed.

Many beam geometries are possible, each with specific advantages for certain situations as will be recognized by those skilled in the art, and they are all included in this disclosure.

The detection of fissile material can be achieved in one embodiment by measuring the energy or energy distribution of the neutrons from the container. If the energy distribution has neutrons with energies greater than that of the neutron beam used to induce fission, the material in the container has, without question, a fissionable material. The number of neutron signals required to trigger such a determination may be varied according to principles well known in the art to limit rates of false positives while avoiding false negatives. In some embodiments, a single detection event may be considered sufficient; in others a predetermined number may be required; in still others the quantity of neutrons required may be predetermined to vary based on chosen algorithms.

The use of angular distributions as well as energy distributions of the neutrons may be included in further determining if the measured energetic neutrons arise from fission. As discussed earlier, the energy distributions and velocity directions of the neutrons are correlated to the directions of the fragments. If the fragment angular distributions are anisotropic, so will the neutron angular distributions be anisotropic. If the fragment angular distributions are isotropic, so will the neutron angular distributions be isotropic. The embodiments of this disclosure use these neutron angular distributions at differing energies of the initiating neutron beam to distinguish between isotopes in the neutron induced fission process. Calibrated anisotropies known to exist at different neutron beam energies for different isotopes will be used.

Other embodiments may take advantage of specific features of the neutron-induced fission process for accurate and efficient detection, and to determine the specific actinide present.

For example, embodiments using thermal neutrons as incident neutrons may take advantage of filters suitably arranged with respect to the neutron detectors, to absorb thermal neutrons. This increase the likelihood that any neutron that registers in the neutron detector is of higher energy, and thus a fission product. By the same token, the neutron detector can be a threshold detector that does not recognize thermal neutrons.

Because prompt neutrons emitted from a fission source in the container may suffer differential absorption along their paths from the container to the neutron detectors, it may be difficult to get a true measure of the angular distribution of the prompt neutrons, such as would enable the determination of the nuclear species involved. In one embodiment, therefore, if fission products are detected using energetic incident neutrons, thermal neutrons are then used as incident neutrons. Since it is known (see above) that the angular distribution of prompt fission neutrons produced from incident thermal neutrons is isotropic, the detection system may be calibrated as to neutron absorption by using the measured angular distribution of the prompt fission neutrons produced by the incident thermal neutrons, and with that calibration information the measured angular distribution of the prompt fission neutrons from the energetic incident neutrons maybe used to determined the nuclear species.

Other embodiments may measure the energy distributions of the prompt fission neutrons detected at different angles, to determine the fission species present.

Another embodiment takes advantage of the unequivocal fission signal that results from the detection of energetic prompt neutrons from neutron-induced fission, to validate a detection of fissionable material made using a photon beam.

Use of a photon beam in the detection process has certain advantages, but there are situations where there may be uncertainty as to whether results are from fission or from a confounding source, such as, for example, $^9$Be present in the container. To avoid such issues, while maintaining some of the advantages of photon-induced fission for detection, a neutron source can be applied to test for neutron-induced fission in the event a potential fission source is found in a photon-induced fission inspection.

Another embodiment removes the uncertainty in the energy distribution and angular dependencies of the prompt neutrons caused by the differential absorption along different paths that neutrons take in traversing a container to the different detectors. This embodiment directs the neutron beam into the container in different directions. For example, in one arrangement the neutron beam enters the container from the top and the neutron detectors view the neutrons at 100 degrees to the beam and at 170 degrees from the beam. By altering the direction of the neutron beam to enter from the side of the container the detectors change roles. The one previously at 100 degrees is now at 170 degrees and the one previously at 170 degrees is now at 100 degrees. However, the differential aspects of neutron absorption remain exactly the same. The two measurements now provide a clear indication of the influence on the neutron energy distribution of the angle of emission of the fission neutrons relative to the neutron beam direction as well as the angular distribution of the neutrons relative to the neutron beam direction. As one particular feature, if the neutron-induced fission process is isotropic the relative neutron yields in the detectors will not change. A change indicates anisotropy of the angular distribution in the original neutron-induced fission process. The change will be a function of the neutron energy and of the nucleus undergoing fission. The embodiments for photon-induced fission with generalized detector angles and photon beam directions and summarized by Equation 1 are also applicable to neutron-induced fission wherein the photon beam is replaced by a neutron beam. All such embodiments are included herein.

Neutron detection can be based on reaction energies between the neutrons and the component materials in the detector. Detectors of such a nature may sometimes but not always be called "threshold detectors" because a reaction will occur only if the neutron energy is greater than a certain amount. Examples of such reactions include but are not limited to (n, n'γ), (n, n'f), (n, n'p), (n, n'd) and (n, n'α). Detection of the event may be based on, but not limited to, the detection of: a scintillation event and measuring the deposited energy; the charge created by ionization in a material and measuring the total charge; and, the detection of radioactive nuclei, wherein the radioactivity would be induced only if the neutron energy (energies) were greater than a certain value (or values). All such methods are included in the embodiments described in this disclosure.

As discussed above, some commercially available plastic and liquid scintillators can identify neutrons unambiguously using suitable signal processing techniques. Such detectors also have fast enough time response to qualify for the purposes herein and these will be known to those skilled in the art. Such detectors operate in part as proton recoil detectors, based on the energy imparted to protons by the elastic scattering of neutrons from the protons in the hydrogenous material. Therefore, in part, they can function as "threshold detectors" as discussed above, as well as providing the time for an event in a detector and identifying the event as a neutron. Such detection methods are part of the embodiments described herein.

Unless otherwise specified, the illustrative embodiments can be understood as providing exemplary features of varying detail of certain embodiments, and therefore, unless otherwise specified, features, components, modules, and/or aspects of the embodiments can be otherwise combined, specified, interchanged, and/or rearranged without departing from the disclosed devices or methods. Additionally, the shapes and sizes of components are also exemplary, and unless otherwise specified, can be altered without affecting the disclosed devices or methods. Other specific embodiments are possible and some are mentioned herein as further illustrations of methods to articulate the concepts and methods described earlier.

Although the terms "nuclear material", "fissionable nuclear material", "fissile material", and "fissionable material" have been variously used in this disclosure, the intent of the inventors is that these terms are used interchangeably and are all intended to designate those materials that can be induced to fission by the effect of a gamma ray or by a thermal neutron or fast neutron. These terms are not intended to mean materials that emit neutrons in response to gamma or neutron irradiation, unless such materials also may be induced to fission by the effect of a gamma ray or by a thermal neutron or a fast neutron.

The term "container" as used herein is intended to include any enclosure or partial enclosure that may enclose or partially enclose a fissionable material so as to hide or partly hide it or shield it or partly shield it from conventional detection methods—it includes but is not limited to cargo and shipping containers and vehicles. The term "container" also is intended to include any assemblage or other aggregation of material or components with the property that interior portions are not visually observable from the outside, such that x-ray or other techniques (such as those disclosed herein) are required to determine the interior contents and/or composition.

The term "determining the energy of a detected neutron", and similar terms, as used herein is intended to encompass as well determining a lower bound on the energy, or a minimum energy, of the neutron, in contexts where the neutron energy or minimum neutron energy determined is being compared to a predetermined energy in order to establish whether the neutron has energy in excess of a given amount.

While the systems and methods disclosed herein have been particularly shown and described with references to exemplary embodiments thereof, it will be understood by those skilled in the art that various changes in form and details may be made therein without departing from the scope of the disclosure. It should be realized this disclosure is also capable of a wide variety of further and other embodiments within the spirit of the disclosure. Those skilled in the art will recognize or be able to ascertain using no more than routine experimentation, many equivalents to the exemplary embodiments described specifically herein. Such equivalents are intended to be encompassed in the scope of the present disclosure.

The invention claimed is:

1. A method of detecting a presence of a material comprising an actinide in a container, comprising:
    a) locating at least one neutron detector such that said detector views said container at a first angle relative to a first incident continuous neutron beam;
    b) illuminating at least a portion of said container with said first incident continuous neutron beam, wherein said first incident continuous neutron beam comprises neutrons with a first predetermined incident neutron energy >1 MeV.;
    c) detecting, in at least one said neutron detector viewing said container at the first angle, a plurality of prompt neutrons produced by a fission interaction of said first incident continuous neutron beam with at least a portion of said container;
    d) for at least one of said detected prompt neutrons, determining a minimum energy of said detected prompt neutron; and
    e) based upon the determined minimum energy of a predetermined quantity of said detected prompt neutrons exceeding a predetermined value, determining that the material comprising the actinide is present in the container.

2. The method of claim 1, wherein determining the minimum energy of said detected neutron comprises analyzing a quantity of energy deposited in at least one of said neutron detectors.

3. The method of claim 1, further comprising locating at least one filter to absorb a plurality of thermal neutrons that otherwise would be incident on the at least one neutron detector.

4. The method of claim 1, wherein the at least one neutron detector is not sensitive to neutrons below a pre-determined minimum neutron detector threshold energy.

5. The method of claim 4, wherein the pre-determined minimum neutron detector threshold energy is above an energy of a thermal neutron.

6. The method of claim 1, further comprising,
    f) determining a neutron energy distribution in at least one of said neutron detectors; and
    g) based upon said determined neutron energy distribution in at least one said neutron detector, identifying an actinide nuclear species present in the container.

7. The method of claim 1, wherein the predetermined value is greater than the first predetermined incident neutron energy.

8. The method of claim 1, further comprising:
    f) illuminating at least a portion of said container with a second incident continuous neutron beam, said second incident continuous neutron beam comprising neutrons with a second predetermined incident neutron energy greater than thermal neutron energies;
    g) detecting, in at least one said neutron detector viewing said container at the first angle, a plurality of neutrons produced by an interaction of said second incident continuous neutron beam with at least a portion of said container;
    h) for at least some of the plurality of said detected neutrons, determining an energy of said detected neutron;
    i) for each of the first predetermined incident neutron energy and the second predetermined incident neutron energy, determining a neutron energy distribution in at least one said neutron detector; and
    j) based upon comparing said determined neutron energy distributions in at least one said neutron detector, resulting from said incident continuous neutron beams, confirming that the material comprising the actinide is present in the container if said neutron energy distributions change by no more than a predetermined amount as a function of incident neutron energy.

9. The method of claim 1, further comprising:
    f) locating at least one neutron detector such that said detector views said container at a second angle relative to the first incident continuous neutron beam;
    g) detecting, in at least one said neutron detector viewing said container at the second angle, a second plurality of neutrons produced by the interaction of said first incident continuous neutron beam with at least a portion of said container;

h) illuminating at least a portion of said container with a second incident continuous neutron beam, said second incident continuous neutron beam comprising thermal neutrons with energies below the predetermined value;

i) detecting, in at least one said neutron detector viewing said container at the first angle, a third plurality of neutrons produced by an interaction of said second incident continuous neutron beam with at least a portion of said container;

j) detecting, in at least one said neutron detector viewing said container at the second angle, a fourth plurality of neutrons produced by the interaction of said second incident continuous neutron beam with at least a portion of said container;

k) based at least in part upon the detection of said neutrons produced by the interaction of said second incident continuous neutron beam with at least a portion of said container, in at least one said neutron detector viewing said container at the first angle and in at least one said neutron detector viewing said container at the second angle, determining a total absorption as a function of neutron energy for neutrons between the container and said detectors;

l) based at least in part upon said total absorption as a function of neutron energy, and at least in part upon the detection of said neutrons produced by the interaction of said first incident continuous neutron beam with at least a portion of said container, in at least one said neutron detector viewing said container at the first angle and in at least one said neutron detector viewing said container at the second angle, identifying an actinide nuclear species present in the container.

10. The method of claim 9, wherein the identification of the actinide nuclear species present is based at least in part upon an anisotropic angular distribution, of the neutrons produced by the interaction of said first incident continuous neutron beam with at least a portion of said container, between neutron detectors viewing the container at said first and second angles.

11. The method of claim 9, wherein the identification of the actinide nuclear species present is based at least in part upon the energy distributions, of the neutrons produced by the interaction of said first incident continuous neutron beam with at least a portion of said container, in neutron detectors viewing the container at said first and second angles.

12. The method of claim 1, further comprising:
f) locating at least one neutron detector such that said detector views said container at a second angle relative to the first incident continuous neutron beam;
g) detecting, in at least one said neutron detector viewing said container at the second angle, a second plurality of neutrons produced by the interaction of said first incident continuous neutron beam with at least a portion of said container;
h) for each of the first angle and the second angle, determining neutron energy distributions in at least one of said neutron detectors viewing said container at said angle;
i) based at least in part upon the energy distributions, in said neutron detectors viewing said container at the first angle and in said neutron detectors viewing said container at the second angle, identifying an actinide nuclear species present in the container.

13. The method of claim 1, further comprising:
f) illuminating at least a portion of said container with a second incident continuous neutron beam, said second incident continuous neutron beam comprising neutrons with a second predetermined incident neutron energy greater than thermal neutron energies;
g) detecting, in at least one said neutron detector viewing said container at the first angle, a second plurality of neutrons produced by an interaction of said second incident continuous neutron beam with at least a portion of said container;
h) for at least one of said detected neutrons, determining a minimum energy of said detected neutron;
i) for each of the first predetermined incident neutron energy and the second predetermined incident neutron energy, determining a fission neutron yield in at least one said neutron detector; and
j) based upon comparing said determined fission neutron yields in at least one said neutron detector, resulting from said incident continuous neutron beams, identifying an actinide nuclear species present in the container.

14. The method of claim 1, further comprising:
f) locating at least one neutron detector such that said detector views said container at a second angle relative to the first incident continuous neutron beam;
g) detecting, in at least one said neutron detector viewing said container at the second angle, a second plurality of neutrons produced by the interaction of said first incident continuous neutron beam with at least a portion of said container;
h) illuminating at least a portion of said container with a second incident continuous neutron beam, said second incident continuous neutron beam comprising neutrons with a second predetermined incident neutron energy greater than thermal neutron energies;
i) detecting, in at least one said neutron detector viewing said container at the first angle, a third plurality of neutrons produced by an interaction of said second incident continuous neutron beam with at least a portion of said container;
j) detecting, in at least one said neutron detector viewing said container at the second angle, a fourth plurality of neutrons produced by the interaction of said second incident continuous neutron beam with at least a portion of said container;
k) for each of the first angle and the second angle, for each said incident neutron energy, determining a neutron energy distribution in at least one of said neutron detectors viewing said container at said angle;
l) based at least in part upon the energy distributions, in said neutron detectors viewing said container at the first angle and in said neutron detectors viewing said container at the second angle, at each incident neutron energy, identifying an actinide nuclear species present in the container.

15. The method of claim 1, further comprising,
f) for a plurality of subportions of the container illuminated by the first incident continuous neutron beam, illuminating, with a second incident continuous neutron beam said subportion of the container,
g) for at least one said subportion, detecting, in at least one said neutron detector viewing said container at the first angle, a second plurality of neutrons produced by an interaction of said second incident continuous neutron beam with said subportion of the container;
h) for at least one said subportion, for at least one of said detected neutrons, determining a minimum energy of said detected neutron; and
i) for at least one said subportion, based upon the determined minimum energy of a predetermined quantity of said detected neutrons exceeding a second predetermined value, determining that the material comprising the actinide is present in said subportion of the container.

16. The method of claim 15, wherein the second incident continuous neutron beam is collimated.

17. The method of claim 1, further comprising:
f) for a plurality of subportions of the container previously illuminated by the first incident continuous neutron beam, further illuminating, with the first incident continuous neutron beam said subportion of the container,
g) for at least one said subportion, further detecting, in at least one said neutron detector viewing said container at the first angle, a second plurality of neutrons produced by an interaction of said first incident continuous neutron beam with said subportion of the container;
h) for at least one said subportion, for at least one of said further detected neutrons, determining a minimum energy of said detected neutron; and
i) for at least one said subportion, based upon the determined minimum energy of a predetermined quantity of said further detected neutrons exceeding a second predetermined value, determining that the material comprising the actinide is present in said subportion of the container.

* * * * *